(12) United States Patent
Shahana et al.

(10) Patent No.: US 11,939,028 B2
(45) Date of Patent: *Mar. 26, 2024

(54) BICYCLE COMPONENT CONTROLLER, BICYCLE COMPONENT CONTROL SYSTEM AND BICYCLE COMPONENT CONTROL METHOD

(71) Applicant: Shimano Inc., Osaka (JP)

(72) Inventors: Satoshi Shahana, Osaka (JP); Mitsuhiko Kawasaki, Osaka (JP); Shota Suyama, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,067

(22) Filed: Apr. 25, 2023

(65) Prior Publication Data

US 2023/0257063 A1 Aug. 17, 2023

Related U.S. Application Data

(63) Continuation of application No. 17/491,925, filed on Oct. 1, 2021, now Pat. No. 11,685,470.

(51) Int. Cl.
| | |
|---|---|
| *B62M 9/122* | (2010.01) |
| *B62J 43/28* | (2020.01) |
| *B62J 43/30* | (2020.01) |
| *B62J 45/20* | (2020.01) |
| *B62J 45/412* | (2020.01) |
| *B62J 45/413* | (2020.01) |
| *B62J 45/415* | (2020.01) |
| *B62M 9/132* | (2010.01) |

(Continued)

(52) U.S. Cl.
CPC .............. *B62M 9/122* (2013.01); *B62J 43/28* (2020.02); *B62J 43/30* (2020.02); *B62J 45/20* (2020.02); *B62J 45/412* (2020.02); *B62J 45/413* (2020.02); *B62J 45/415* (2020.02); *B62M 9/132* (2013.01); *B62M 25/02* (2013.01); *B62M 25/08* (2013.01)

(58) Field of Classification Search
CPC ...... B62M 9/122; B62M 9/132; B62M 25/02; B62M 25/08; B62M 9/12; B62J 43/28; B62J 43/30; B62J 45/20; B62J 45/412; B62J 45/413; B62J 45/415; F16H 55/30
See application file for complete search history.

(56) References Cited

U.S. PATENT DOCUMENTS

| | | | |
|---|---|---|---|
| 6,340,338 B1 * | 1/2002 | Kamada | ................. B62M 9/122 474/160 |
| 6,467,786 B2 | 10/2002 | Horiuchi | |
| 9,157,523 B2 | 10/2015 | Miki et al. | |

(Continued)

FOREIGN PATENT DOCUMENTS

| | | | | |
|---|---|---|---|---|
| CN | 1660663 A | * | 8/2005 | .......... B62M 25/045 |
| CN | 107499449 A | * | 12/2017 | .............. B62M 9/10 |

*Primary Examiner* — Justin Holmes
(74) *Attorney, Agent, or Firm* — Global IP Counselors, LLP

(57) ABSTRACT

A bicycle component controller is basically provided with a processor. The processor is configured to perform a gear shift control based on a sprocket assembly information of at least one sprocket assembly. The sprocket assembly information at least includes a single shifting distance and shifting gate information. The single shifting distance corresponds to an axial spacing between adjacent sprockets of the at least one sprocket assembly.

32 Claims, 13 Drawing Sheets

(51) Int. Cl.
*B62M 25/02* (2006.01)
*B62M 25/08* (2006.01)

(56) References Cited

U.S. PATENT DOCUMENTS

| | | |
|---|---|---|
| 10,865,870 B2 | 12/2020 | Yamazaki et al. |
| 11,685,470 B2* | 6/2023 | Shahana ................ B62M 9/122 |
| | | 701/58 |
| 2007/0150153 A1* | 6/2007 | Guderzo ................ B62M 9/122 |
| | | 701/51 |
| 2007/0207885 A1 | 9/2007 | Watari |
| 2016/0257375 A1 | 9/2016 | Emura et al. |
| 2019/0017586 A1 | 1/2019 | Sugimoto |

\* cited by examiner

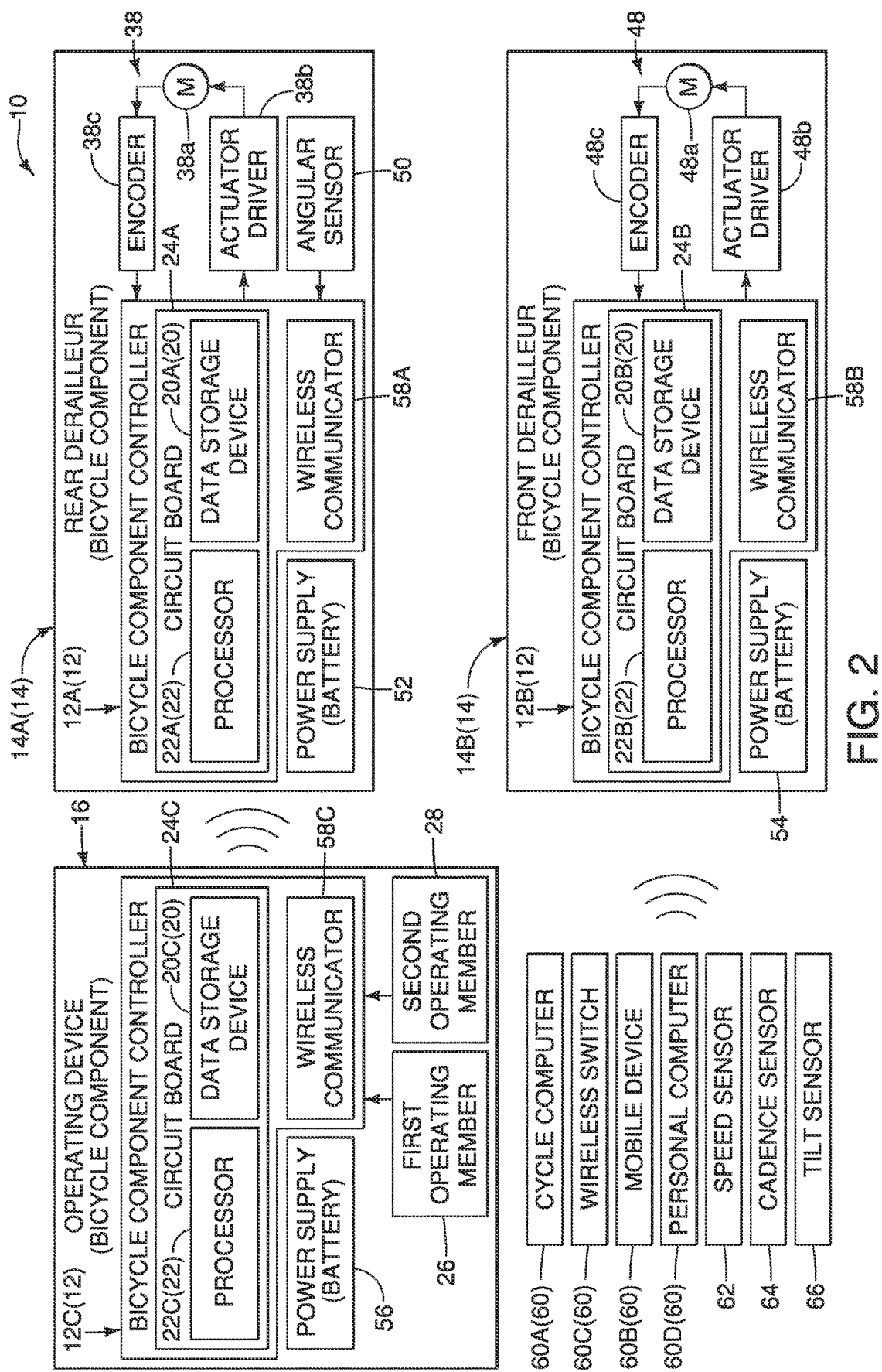

BICYCLE COMPONENT CONTROLLER, BICYCLE COMPONENT CONTROL SYSTEM AND BICYCLE COMPONENT CONTROL METHOD

CROSS-REFERENCE TO RELATED APPLICATIONS

This application is a continuation prior U.S. application Ser. No. 17/491,925, filed on Oct. 1, 2021, and claims priority to U.S. application Ser. No. 17/491,925 under 35 U.S.C. § 120. The entire disclosure of U.S. application Ser. No. 17/491,925 is hereby incorporated herein by reference.

BACKGROUND

Technical Field

This disclosure generally relates to a bicycle component controller, a bicycle component control system and a bicycle component control method for performing a gear shift control at least based on sprocket assembly information.

Background Information

In recent years, some bicycles are provided with electrical bicycle components or devices to make it easier for the rider to operate the bicycle. For example, some bicycles are provided with an electrically operated drivetrain for smoother shifting. Electrically operated drive may be controlled manually by a rider or controlled automatically by a controller. In the case of manual control, a button or lever on a shift control device is manipulated so that a gear shift command is output to operate a motor to upshift or downshift the bicycle transmission accordingly. In the case of automatic control, gear shift commands are generated automatically based on various bicycle conditions such as forward speed. Some of these electrically operated drivetrain use a rear multi-stage sprocket assembly with a motorized rear derailleur and a front multi-stage sprocket assembly with a motorized front derailleur. These motorized derailleurs are electrically operated by a cycle computer for operating a motor to perform a shifting operation. One example of a controller for performing a shifting operation is disclosed in U.S. Patent Application Publication No. 2007/0207885A1.

SUMMARY

Generally, the present disclosure is directed to various features a bicycle component controller, a bicycle component control system and a bicycle component control method for controlling a bicycle derailleur in accordance the sprocket assembly being used. More specifically, the bicycle component controller, the bicycle component control system and the bicycle component control method basically control an operating amount of an actuator per single shifting distance, and a motion of the actuator based on information of the sprocket assembly.

In view of the state of the known technology and in accordance with a first aspect of the present disclosure, a bicycle component controller is provided that basically comprises a processor. The processor is configured to perform a gear shift control based on a sprocket assembly information of at least one sprocket assembly. The sprocket assembly information at least includes a single shifting distance and shifting gate information. The single shifting distance corresponds to an axial spacing between adjacent sprockets of the at least one sprocket assembly.

With the bicycle component controller according to the first aspect, it is possible to perform a gear shift control based on sprocket assembly information such that a user can select a sprocket assembly according to usage.

In accordance with a second aspect of the present disclosure, the bicycle component controller according to the first aspect is configured so that in response to receiving a double downshift command, if the shifting gate information indicates that each of the sprockets of the at least one sprocket assembly includes a single downshifting gate except for a smallest sprocket of the at least one sprocket assembly, the processor is configured to perform the gear shift control. The gear shift control includes performing a first downshifting operation corresponding to the single shifting distance, waiting a first predetermined period after completing the first downshifting operation, and performing a second downshifting operation corresponding to the single shifting distance.

With the bicycle component controller according to the second aspect, it is possible to easily and smoothly perform a double downshifting operation in response to a double downshift command.

In accordance with a third aspect of the present disclosure, the bicycle component controller according to the second aspect is configured so that the first predetermined period is set based on at least one of a time, a rear sprocket rotational angle, and a bicycle running distance.

With the bicycle component controller according to the third aspect, the second downshifting operation can be perform at the appropriate time after performing the first downshifting operation.

In accordance with a fourth aspect of the present disclosure, the bicycle component controller according to the third aspect is configured so that the rear sprocket rotational angle is calculated from a crank cadence and a transmission gear ratio.

With the bicycle component controller according to the fourth aspect, the rear sprocket rotational angle can be easily calculated from the crank cadence and the transmission gear ratio.

In accordance with a fifth aspect of the present disclosure, the bicycle component controller according to any one of the first aspect to the fourth aspect is configured so that in response to receiving a double upshift command, if the shifting gate information indicates that a larger sprocket of the adjacent sprockets of the at least one sprocket assembly is free of an up shifting gate, the processor is configured to perform the gear shift control including performing an upshifting operation corresponding to a double shifting distance.

With the bicycle component controller according to the fifth aspect, it is possible to perform the gear shift control in a case where no upshifting gate exists.

In accordance with a sixth aspect of the present disclosure, the bicycle component controller according to any one of the first aspect to the fifth aspect is configured so that in response to receiving a double upshift command, if the shifting gate information indicates that each of the sprockets of the at least one sprocket assembly includes a single up shifting gate except for a smallest sprocket of the at least one sprocket assembly, the processor is configured to perform the gear shift control. In this case, the gear shift control includes performing a first upshifting operation corresponding to the single shifting distance, waiting a second predetermined period after completing the first upshifting operation, and performing a second upshifting operation corresponding to the single shifting distance.

With the bicycle component controller according to the sixth aspect, the second upshifting operation can be perform at the appropriate time after performing the first upshifting operation.

In accordance with a seventh aspect of the present disclosure, the bicycle component controller according to the sixth aspect is configured so that the first predetermined period is larger than the second predetermined period.

With the bicycle component controller according to the seventh aspect, it is possible to perform the second upshifting operation more quickly than the first downshifting operation.

In accordance with an eighth aspect of the present disclosure, the bicycle component controller according to the first aspect is configured so that in response to receiving a double downshift command, if the shifting gate information indicates that each of the sprockets of the at least one sprocket assembly includes at least two downshifting gates except for a smallest sprocket of the at least one sprocket assembly, the processor is configured to perform the gear shift control. In this case, the gear shift control includes performing a first downshifting operation corresponding to the single shifting distance, waiting a first predetermined period after completing the first downshifting operation, and performing a second downshifting operation corresponding to the single shifting distance.

With the bicycle component controller according to the eighth aspect, it is possible to easily and smoothly perform a double downshifting operation in response to a double downshift command.

In accordance with a ninth aspect of the present disclosure, the bicycle component controller according to the eighth aspect is configured so that in response to receiving a double upshift command, if the shifting gate information indicates that each of the sprockets of the at least one sprocket assembly includes a single upshifting gate except for a smallest sprocket of the at least one sprocket assembly, the processor is configured to perform the gear shift control. In this case, the gear shift control includes performing a first upshifting operation corresponding to the single shifting distance, waiting a second predetermined period after completing the first upshifting operation, and performing a second upshifting operation corresponding to the single shifting distance.

With the bicycle component controller according to the ninth aspect, it is possible to easily and smoothly perform a double upshifting operation in response to a double upshift command.

In accordance with a tenth aspect of the present disclosure, the bicycle component controller according to the ninth aspect is configured so that the first predetermined period is larger than the second predetermined period.

With the bicycle component controller according to the tenth aspect, it is possible to perform the second upshifting operation more quickly than the first downshifting operation.

In accordance with an eleventh aspect of the present disclosure, the bicycle component controller according to the eighth aspect is configured so that in response to receiving a double upshift command, if the shifting gate information indicates that each of the sprockets of the at least one sprocket assembly includes at least two upshifting gates except for a smallest sprocket of the at least one sprocket assembly, the processor is configured to perform the gear shift control. In this case, the gear shift control includes performing a first upshifting operation corresponding to the single shifting distance, waiting a second predetermined period after completing the first upshifting operation, and performing a second upshifting operation corresponding to the single shifting distance.

With the bicycle component controller according to the eleventh aspect, it is possible to easily and smoothly perform a double upshifting operation in response to a double upshift command.

In accordance with a twelfth aspect of the present disclosure, the bicycle component controller according to the eleventh aspect is configured so that the first predetermined period is equal to the second predetermined period where a total number of the upshifting gates is equal to a total number the downshifting gates.

With the bicycle component controller according to the twelfth aspect, the downshifting operation and the upshifting operation can be perform at the appropriate times.

In accordance with a thirteenth aspect of the present disclosure, the bicycle component controller according to any one of the first aspect to the twelfth aspect is configured so that the processor is configured to automatically perform the gear shift control based on at least one of a cadence, a bicycle running speed, a bicycle tilt, and a gear ratio.

With the bicycle component controller according to the thirteenth aspect, the processor can automatically perform the gear shift control based on a bicycle riding condition without have a user to input a command.

In accordance with a fourteenth aspect of the present disclosure, the bicycle component controller according to any one of the first aspect to the thirteenth aspect is configured so that the processor is configured to perform the gear shift control response to a manual input which is input to a shifter.

With the bicycle component controller according to the fourteenth aspect, a user can selectively determine when to perform the gear shift control.

In accordance with a fifteenth aspect of the present disclosure, a bicycle component control system is provided that comprises the bicycle component controller according to any one of the first aspect to the fourteenth aspect and further comprises a bicycle derailleur.

With the bicycle component control system according to the fifteenth aspect, the bicycle component controller can be used to control a bicycle derailleur to perform the gear shift control.

In accordance with a sixteenth aspect of the present disclosure, the bicycle component control system according to the fifteenth aspect is configured so that the bicycle derailleur includes at least one of a rear derailleur and a front derailleur.

With the bicycle component control system according to the sixteenth aspect, the bicycle component controller can be used to control at least one of a rear derailleur and a front derailleur to perform the gear shift control.

In accordance with a seventeenth aspect of the present disclosure, the bicycle component control system according to the sixteenth aspect is configured so that the bicycle derailleur is a rear derailleur.

With the bicycle component control system according to the seventeenth aspect, the bicycle component controller can be used to control a rear derailleur to perform the gear shift control.

In accordance with an eighteenth aspect of the present disclosure, the bicycle component control system according to any one of the fifteenth aspect to the seventeenth aspect is configured so that the bicycle derailleur includes a base member configured to be mounted to a bicycle frame, a movable member movable relative to the base member, a linkage mechanism configured to connect the base member to the movable member, and a pulley assembly rotatably connected to the movable member about a pulley assembly pivot axis.

With the bicycle component control system according to the eighteenth aspect, the bicycle derailleur can be mounted to a bicycle frame to move a movable member relative to the base member to perform the gear shift control.

In accordance with a nineteenth aspect of the present disclosure, the bicycle component control system according to the eighteenth aspect is configured so that the bicycle derailleur further includes an actuator operably connected to the linkage mechanism.

With the bicycle component control system according to the nineteenth aspect, the actuator can be used to move the movable member relative to the base member to perform the gear shift control.

In accordance with a twentieth aspect of the present disclosure, the bicycle component control system according to the nineteenth aspect is configured so that the actuator is disposed to one of the base member, the movable member, and the linkage mechanism.

With the bicycle component control system according to the twentieth aspect, the bicycle derailleur can be provided as an integrated unit by providing the actuator to one of the base member, the movable member, and the linkage mechanism.

In accordance with a twenty-first aspect of the present disclosure, the bicycle component control system according to the nineteenth aspect is configured so that the actuator is configured to be disposed to a bicycle frame, and the actuator operates a cable that is connected to the bicycle derailleur for operating the bicycle derailleur.

With the bicycle component control system according to the twenty-first aspect, it is possible to a conventional bicycle derailleur that is cable operated by providing the actuator to a bicycle frame and connecting the actuator to the bicycle derailleur by a cable.

In accordance with a twenty-second aspect of the present disclosure, the bicycle component control system according to any one of the eighteenth aspect to the twenty-first aspect is configured so that the bicycle derailleur further an angular sensor is disposed between the movable member and the pulley assembly for detecting a rotation angle of the pulley assembly with respect to the movable member.

With the bicycle component control system according to the twenty-second aspect, it is possible to determine a gear position of the bicycle derailleur by detecting the rotation angle of the pulley assembly with respect to the movable member.

In accordance with a twenty-third aspect of the present disclosure, the bicycle component control system according to any one of the eighteenth aspect to the twenty-second aspect is configured so that the bicycle derailleur further includes a battery disposed to one of the base member, the movable member, and the linkage mechanism.

With the bicycle component control system according to the twenty-third aspect, the bicycle derailleur can be provided as an integrated unit by providing the battery to one of the base member, the movable member, and the linkage mechanism.

In accordance with a twenty-fourth aspect of the present disclosure, the bicycle component control system according to any one of the fifteenth aspect to the twenty-second aspect further comprises a battery configured to be disposed to a bicycle frame, and electrically connected to the bicycle derailleur.

With the bicycle component control system according to the twenty-fourth aspect, it is possible to use a larger battery that can be used for several bicycle components.

In accordance with a twenty-fifth aspect of the present disclosure, the bicycle component control system according to twenty-third aspect or the twenty-fourth aspect is configured so that the bicycle component controller is disposed to at least one of the battery and the derailleur.

With the bicycle component control system according to the twenty-fifth aspect, it is possible to conveniently locate the bicycle component controller in an appropriate location for the bicycle component control system.

In accordance with a twenty-sixth aspect of the present disclosure, the bicycle component control system according to one of the fifteenth aspect to the twenty-fifth aspect further comprises a non-shifting input device configured to select one of the sprocket assembly information of the at least one sprocket assembly for use in determining the gear shift control.

With the bicycle component control system according to the twenty-sixth aspect, it is possible to easily store or change the sprocket assembly information by using a non-shifting input device.

In accordance with a twenty-seventh aspect of the present disclosure, the bicycle component control system according to the twenty-sixth aspect is configured so that the non-shifting input device includes at least one of a cycle computer, a smartphone, a personal computer, and a switch provided to a bicycle.

With the bicycle component control system according to the twenty-seventh aspect, the sprocket assembly information can be stored or changed using at least one of a cycle computer, a smartphone, a personal computer, and a switch provided to a bicycle.

In accordance with a twenty-eighth aspect of the present disclosure, the bicycle component control system according to the twenty-sixth aspect is configured so that the bicycle component controller is configured to wirelessly communicate with the non-shifting input device.

With the bicycle component control system according to the twenty-eighth aspect, the bicycle component controller can conveniently communicate with the non-shifting input device without using a wire.

In accordance with a twenty-ninth aspect of the present disclosure, the bicycle component control system according to the twenty-sixth aspect is configured so that the bicycle component controller is configured to communicate with the non-shifting input device via a wire.

With the bicycle component control system according to the twenty-ninth aspect, the bicycle component controller can reliably communicate with the non-shifting input device using a wire.

In accordance with a thirtieth aspect of the present disclosure, a bicycle component control method is performed that comprises providing a bicycle with the bicycle component control system according to any one of the twenty-sixth aspect to the twenty-ninth aspect. The bicycle component control method further comprises selecting the at least one sprocket assembly by using the non-shifting input device, and transmitting the sprocket assembly information of the at least one sprocket assembly selected with the non-shifting input device to the bicycle component controller for setting the bicycle component.

With the bicycle component control method according to the thirtieth aspect, it is possible to set the bicycle component by using the non-shifting input device.

In accordance with a thirty-first aspect of the present disclosure, the bicycle component control method according to the thirtieth aspect is configured so that the selecting of the at least one sprocket assembly is performed by selecting a model of the at least one sprocket assembly using the non-shifting input device.

With the bicycle component control method according to the thirty-first aspect, it is possible to easily select the sprocket assembly by a model using the non-shifting input device.

In accordance with a thirty-second aspect of the present disclosure, the bicycle component control system according to the thirtieth is configured so that the selecting of the at least one sprocket assembly is performed by scanning or taking a picture of indication representing a model of the at least one sprocket assembly using the non-shifting input device.

With the bicycle component control system according to the thirty-second aspect, it is possible to easily select the sprocket assembly by a scanning or taking a picture using the non-shifting input device.

Also, other objects, features, aspects and advantages of the disclosed bicycle component controller, the disclosed bicycle component control system and the disclosed bicycle component control method will become apparent to those skilled in the bicycle field from the following detailed description, which, taken in conjunction with the annexed drawings, discloses preferred embodiments of the bicycle component controller, the bicycle component control system and the bicycle component control method.

BRIEF DESCRIPTION OF THE DRAWINGS

Referring now to the attached drawings which form a part of this original disclosure.

FIG. 2 is an overall schematic block diagram showing an electrical configuration of the bicycle component control system of the bicycle illustrated in FIG. 1.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
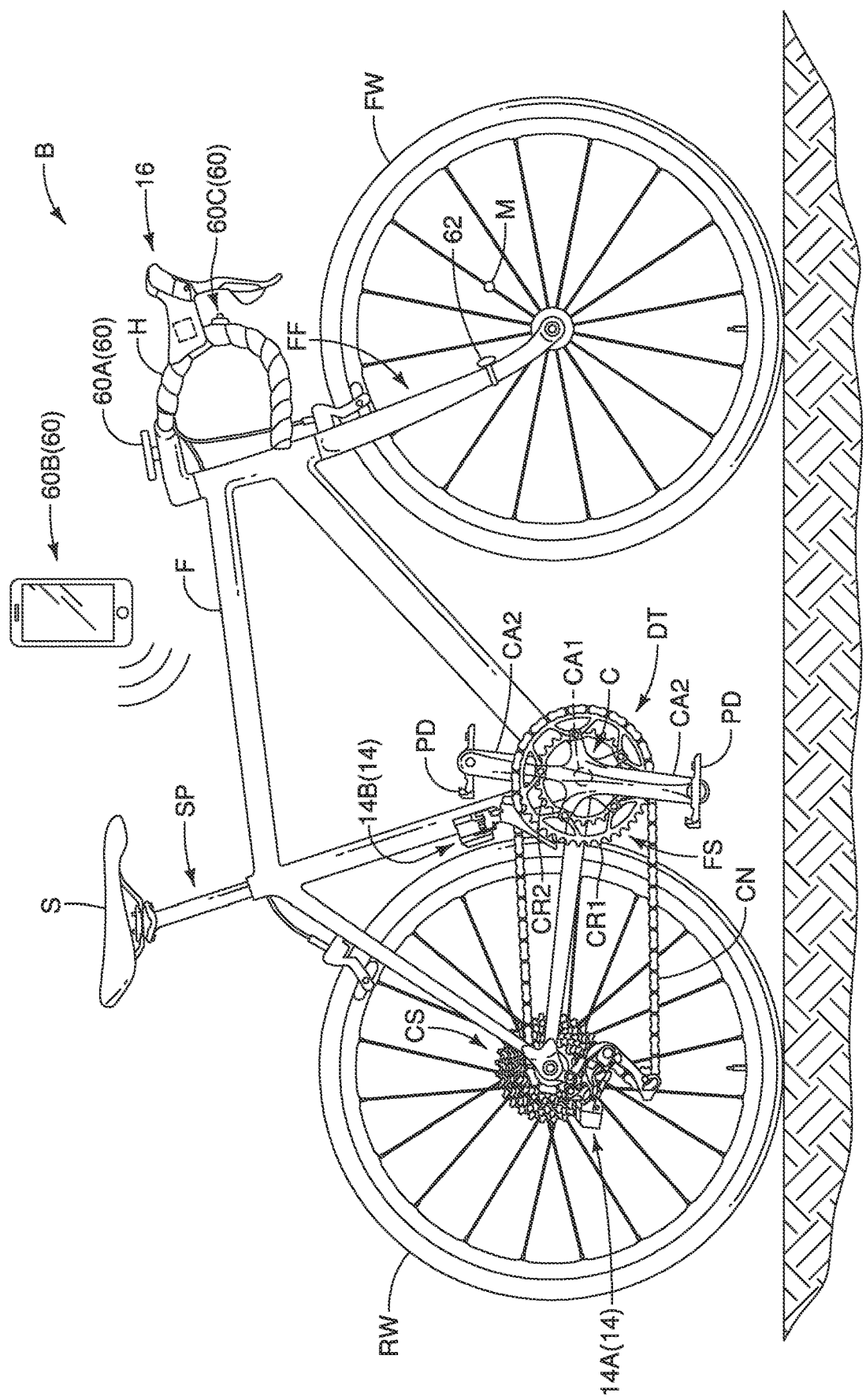
FIG. 1 is a side elevational view of a bicycle that is equipped with a bicycle component control system having a bicycle component controller in accordance with one illustrated embodiment of the present disclosure.

Referring initially to FIG. 1, a bicycle B is illustrated that is equipped with a bicycle component control system 10 in accordance with one illustrated embodiment. The bicycle B is illustrated as a road bike. However, the bicycle component control system 10 can be applied to any other type of bicycles such as, for example, a mountain bike, a cyclocross bicycle, a gravel bike, a city bike, a cargo bike, and a recumbent bike. As shown in FIG. 1, the bicycle B includes a bicycle frame F that is supported by a rear wheel RW and a front wheel FW. A front suspension fork FF is pivotally coupled at its upper end to the bicycle frame F, and rotatably supports the front wheel FW at its lower end. The bicycle B further includes a handlebar H mounted to the upper end of the front fork FF for steering the front wheel FW. The rear wheel RW is rotatably mounted to a rear end of the bicycle frame F. A seatpost SP is mounted to a seat tube of the bicycle frame F in a conventional manner and supports a bicycle seat or saddle S in any suitable manner.

The bicycle B further includes a drivetrain DT. Here, for example, the drivetrain DT is a chain-drive type that includes a crank C, a front sprocket assembly FS, a rear sprocket assembly CS and a chain CN. The crank C includes a crank axle CA1 and a pair of crank arms CA2. The crank axle CA1 is rotatably supported to the bicycle frame F in a conventional manner. The crank arms CA2 are provided on opposite ends of the crank axle CA1. A pedal PD is rotatably coupled to the distal end of each of the crank arms CA2. In the case of the bicycle B, the front sprocket assembly FS includes a first chainring CR1 and a second chainring CR2. The first chainring CR1 and the second chainring CR2 are provided on the crank C to rotate integrally with the crank axle CA1. The rear sprocket assembly CS is provided on a hub of the rear wheel RW. The rear sprocket assembly CS includes a first sprocket 51, a second sprocket S2, a third sprocket S3, a fourth sprocket S4, a fifth sprocket S5, a sixth sprocket S6, a seventh sprocket S7, an eighth sprocket S8, and a ninth sprocket S9. The chain CN runs around the front sprocket assembly FS and the rear sprocket assembly CS. A human driving force is applied to the pedals PD by a rider such that the driving force is transmitted via the front sprocket assembly FS, the chain CN and the rear sprocket assembly CS to the rear wheel RW.

As seen in FIG. 2, the bicycle component control system 10 basically comprises a bicycle component controller 12 and a bicycle derailleur 14. Here, the bicycle component control system 10 further comprises at least one operating device 16. The bicycle derailleur 14 and the operating device 16 are two examples of bicycle components of the bicycle component control system 10. Here, the operating device 16 is configured to wirelessly communicate with the bicycle derailleur 14. Alternatively, the operating device 16 can be configured to communicate with the bicycle derailleur 14 by a dedicated signal wire or by a power wire using power line communication (PLC). As explained later, the bicycle derailleur 14 and/or the operating device 16 can include the bicycle component controller 12.

Preferably, the bicycle derailleur 14 includes at least one of a rear derailleur 14A and a front derailleur 14B. Here, in the basic embodiment, the bicycle derailleur 14 is the rear derailleur 14A. However, the bicycle derailleur 14 can either just include the front derailleur 14B, or can include both the rear derailleur 14A and the front derailleur 14B. As seen in FIG. 2, the operating device 16 is configured to wirelessly communicate with the rear derailleur 14A and the front derailleur 14B. However, the operating device 16 can communicate with the bicycle derailleur via an electrical cable.

As seen in FIG. 2, the bicycle component controller 12 includes at least one of a bicycle component controller 12A provided to the rear derailleur 14A, a bicycle component controller 12B provided to the front derailleur 14B and a bicycle component controller 12C provided to the operating device 16. Thus, the term "controller" as used herein refers to hardware that executes a software program, and does not include a human. The bicycle component controller 12 can also be referred to as an electronic bicycle component controller 12 or just as an electronic controller 12. The bicycle component controller 12 can include one or more processors and one or more data storage devices.

The bicycle component controller 12 basically comprises a data storage device 20 and a processor 22. Thus, the bicycle component controller 12A comprises a data storage device 20A and a processor 22A. Here, the storage device 20A and the processor 22A are provided on a circuit board 24A. Similarly, the bicycle component controller 12B comprises a data storage device 20B and a processor 22B, and the bicycle component controller 12C comprises a data storage device 20C and a processor 22C. Here, the storage device 20B and the processor 22B are provided on a circuit board 24B, while the storage device 20C and the processor 22C are provided on a circuit board 24C.

The data storage device 20A is a memory device that stores programs used by the processor 22A. The data storage device 20A contains sprocket assembly information of at least one sprocket assembly. Here, the data storage device 20A includes sprocket assembly information corresponding to a plurality of different rear sprocket assemblies. The data storage device 20B is a memory device that stores programs used by the processor 22B. The data storage device 20B contains sprocket assembly information of at least one sprocket assembly. Here, the data storage device 20B includes sprocket assembly information corresponding to a plurality of different front sprocket assemblies. The data storage device 20C is a memory device that stores programs used by the processor 22C. The data storage device 20C contains sprocket assembly information of at least one sprocket assembly. Here, the data storage device 20C includes sprocket assembly information corresponding to a plurality of different rear sprocket assemblies and a plurality of different front sprocket assemblies. Each of the data storage devices 20A, 20B and 20C is any computer storage device or any computer readable medium with the sole exception of a transitory propagating signal. For example, each of the data storage devices 20A, 20B and 20C can be nonvolatile memory and volatile memory, and can includes a ROM (Read Only Memory) device, a RAM (Random Access Memory) device, a hard disk, a flash drive, etc.

For each of the data storage devices 20A, 20B and 20C, the sprocket assembly information of the at least one sprocket assembly at least includes a total sprocket number and shifting gate information. The term "shifting gate information" as used herein refers to a tooth or teeth of a current sprocket configured to form a shifting path from the current sprocket to the next adjacent sprocket. The term "upshifting gate" as used herein refers to a tooth or teeth of a current sprocket configured to form an upshifting shifting path from the current sprocket to the next adjacent smaller sprocket. The term "downshifting gate" as used herein refers to a tooth or teeth of a current sprocket configured to form a downshifting shifting path from the current sprocket to the next adjacent larger sprocket. Thus, the shifting gate information of a sprocket assembly includes the number of upshifting gates for each of the sprockets, and the number of downshifting gates for each of the sprockets.

Figure 5:
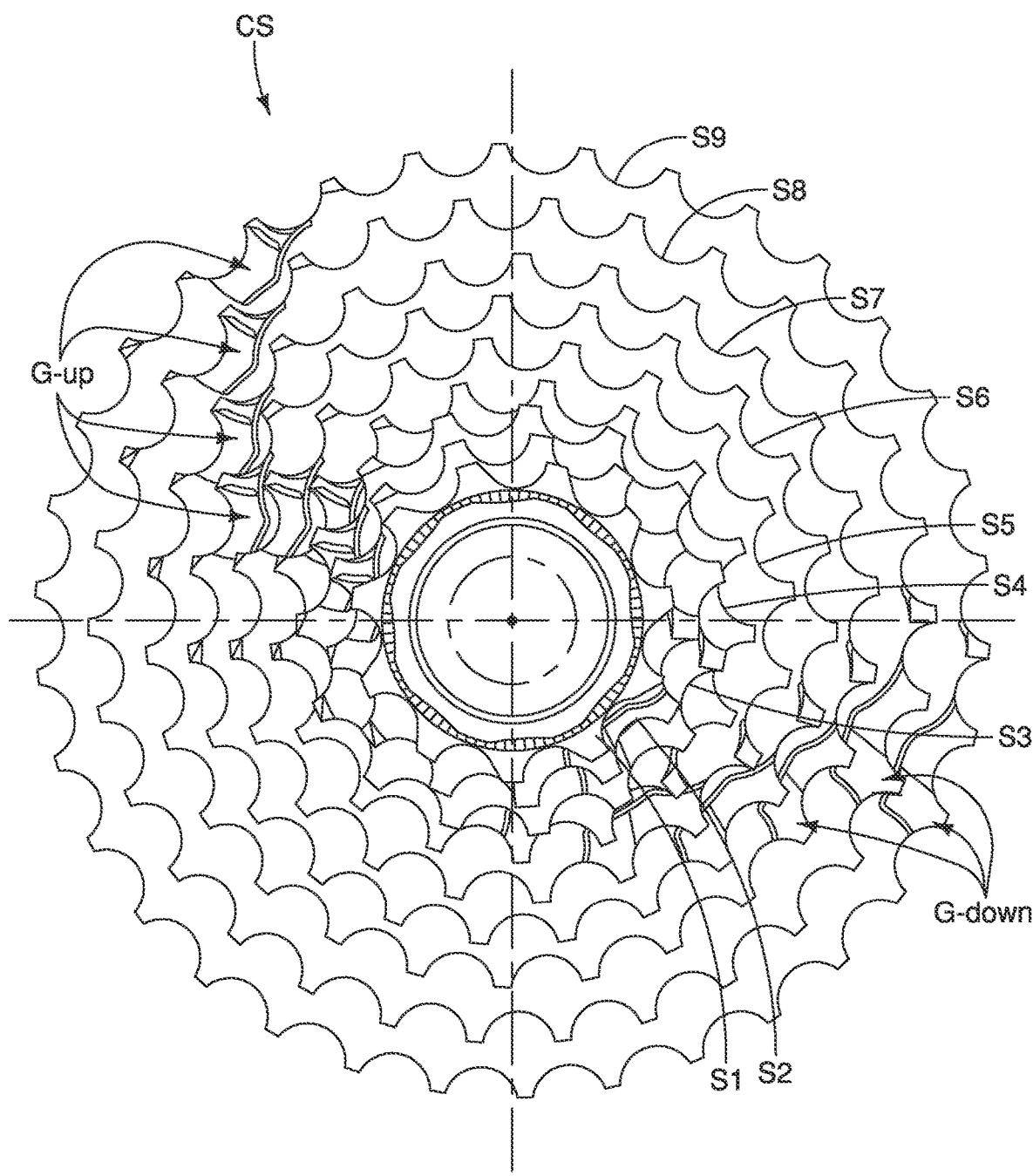
FIG. 5 is a side elevational view of a first sprocket assembly of the bicycle illustrated in FIG. 1.
Figure 6:
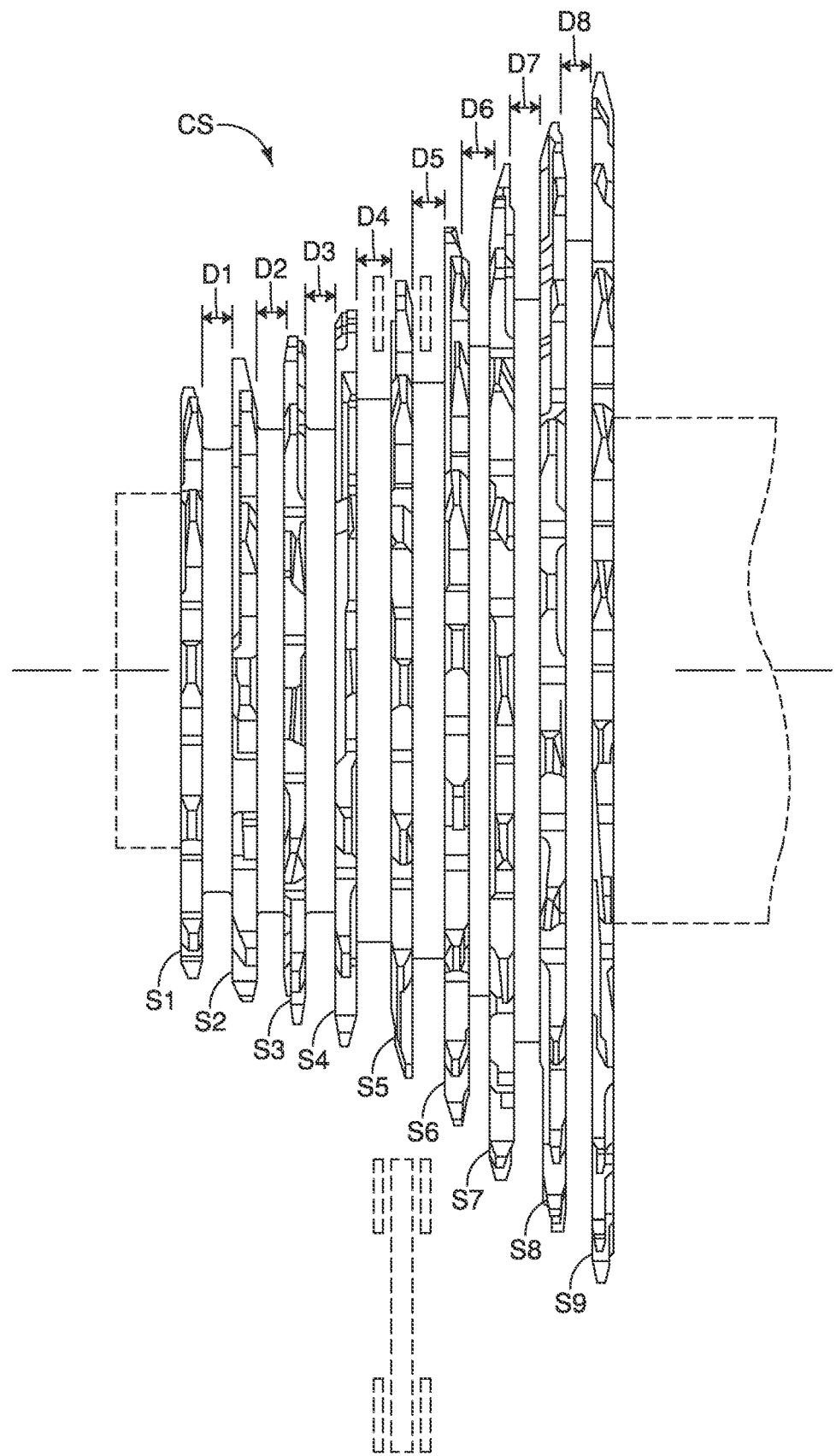
FIG. 6 is a top view of the first sprocket assembly illustrated in FIG. 5 in which the chain is shown in dashed lines.

For example, as seen in FIGS. 5 and 6, the rear sprocket assembly CS has nine sprockets. In other words, the total sprocket number of the rear sprocket assembly CS is nine. However, the rear sprocket assembly CS can include equal to or more than ten sprockets. The rear sprocket assembly CS can include more than eleven sprocket. Here, the shifting gate information of the rear sprocket assembly CS includes each of the sprockets S2 to S9 having one upshifting gate G-up and one downshifting gate G-down.

The processor 22A can be a Central Processing Unit (CPU) or a Micro-Processing Unit (MPU) of the rear derailleur 14A. The processor 22A is configured to access the sprocket assembly information and a rear derailleur control program stored in the data storage device 20A. The processor 22B can be a Central Processing Unit (CPU) or a Micro-Processing Unit (MPU) of the front derailleur 14B. The processor 22B is configured to access the sprocket assembly information and a front derailleur control program stored in the data storage device 20B. The processor 22C can be a Central Processing Unit (CPU) or a Micro-Processing Unit (MPU) of the operating device 16. The processor 22C is configured to access the sprocket assembly information, a rear derailleur control program and a front derailleur control program stored in the data storage device 20C.

Figure 3:
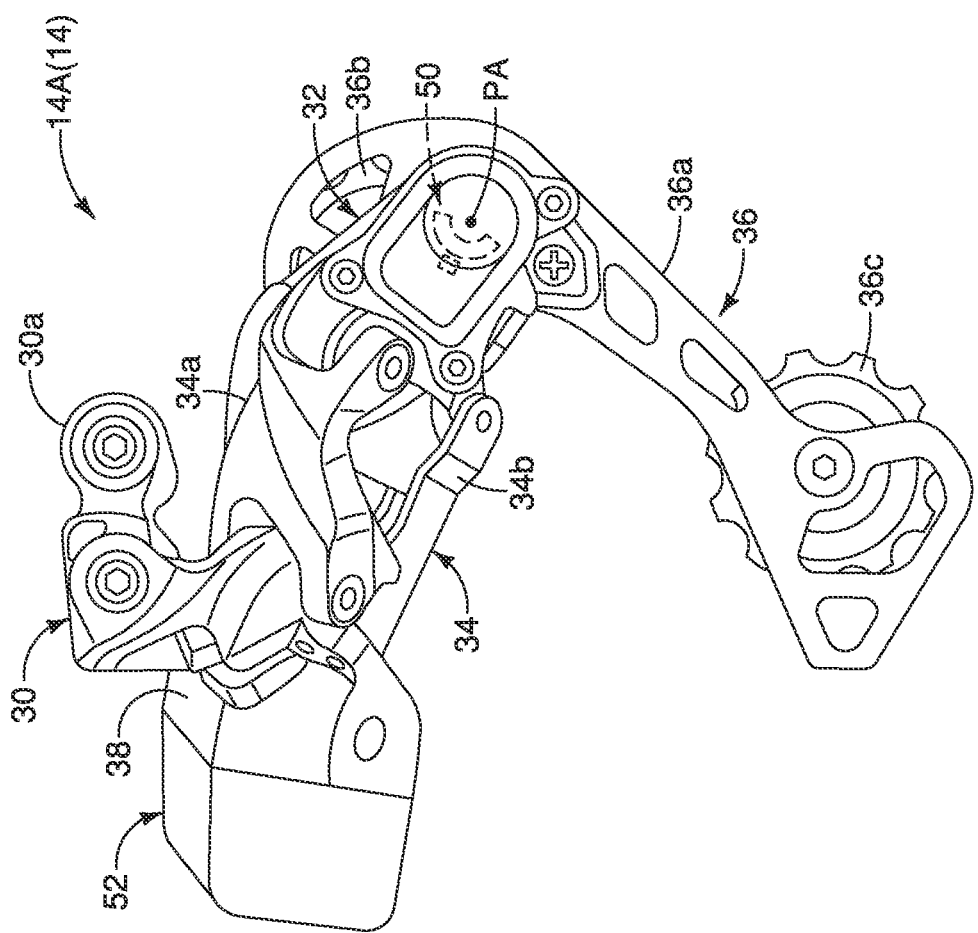
FIG. 3 is a side elevational view of a rear derailleur of the bicycle illustrated in FIG. 1.

As seen in FIG. 3, a bicycle derailleur basically includes a base member, a movable member, a linkage mechanism and a pulley assembly. Thus, rear derailleur 14A includes a base member 30, a movable member 32, a linkage mechanism 34 and a pulley assembly 36. The base member 30 is configured to be mounted to the bicycle frame F. The movable member 32 is movable relative to the base member 30. The linkage mechanism 34 is configured to connect the base member 30 to the movable member 32. The pulley assembly 36 is rotatably connected to the movable member 32 about a pulley assembly pivot axis PA. The base member 30 includes a frame mount 30a for mounting the rear derailleur 14A to the bicycle frame F. The bicycle derailleur can further includes an actuator that is operably connected to the linkage mechanism. Thus, the rear derailleur 14A further includes an actuator 38 that is operably connected to the linkage mechanism. Preferably, the actuator 38 is disposed to one of the base member 30, the movable member 32, and the linkage mechanism 34. Here, the actuator 38 includes a reversible electric motor unit 38a that is provided on the base member 30. The actuator 38 also includes an actuator driver 38b and an encoder 38c. The electric motor unit 38a is operatively coupled to the linkage 34 for moving the pulley assembly 36 between a plurality of sprocket positions. The linkage mechanism 34 includes a first link 34a and a second link 34b. Each of the first link 34a and the second link 34b has a first end pivotally attached to the base member 30, and a second end pivotally attached to the movable member 32. The base member 30, the movable member 32, the first link 34a and the second link 34b form a four-bar linkage. The pulley assembly 36 includes a chain guide 36a, a guide pulley 36b and a tension pulley 36c. The encoder 38c is configured to detect an absolute rotational position of a rotational shaft of a motor or a gear reducer of the motor unit 38a. In this way, the position of the guide pulley 36b with respect to the base member 30 can be determined. Thus, the gear position, which of the rear sprockets S1 to S9 is engaged with the chain CN, of the rear derailleur 14A can be readily determined.

Figure 4:
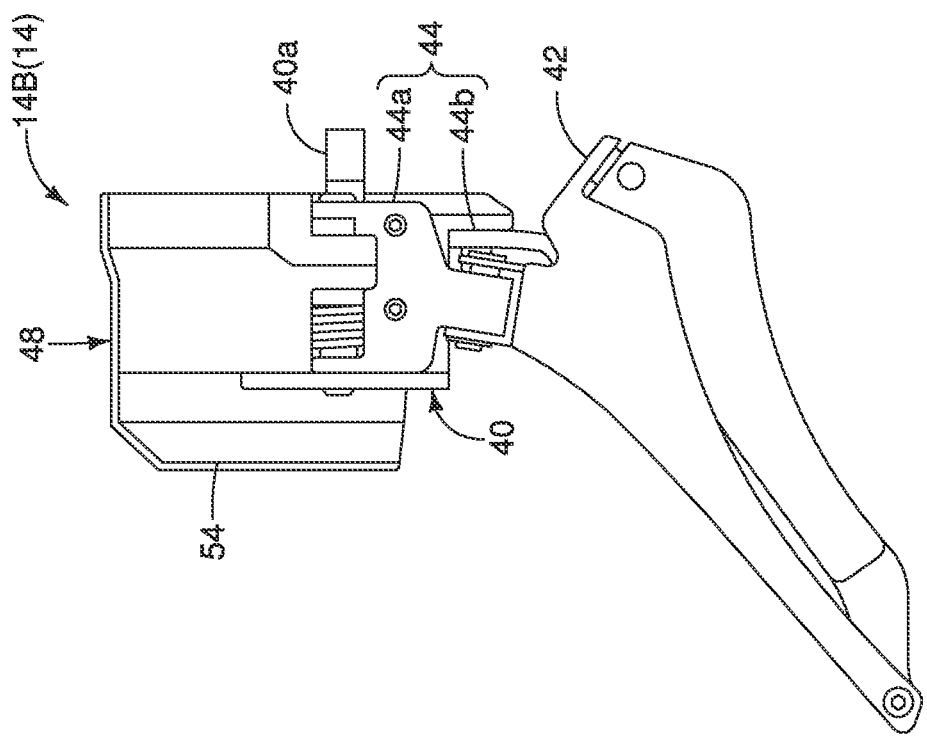
FIG. 4 is a side elevational view of a front derailleur of the bicycle illustrated in FIG. 1.

As seen in FIG. 4, the front derailleur 14B includes a base member 40, a movable member 42 and a linkage mechanism 44. The base member 40 is configured to be mounted to the bicycle frame F. The base member 40 includes a frame mount 40a for mounting the front derailleur 14B to the bicycle frame F. The movable member 42 is movable relative to the base member 40. The front derailleur 14B further includes an actuator 48 that is operably connected to the linkage mechanism 44. Preferably, the actuator 48 is disposed to one of the base member 40, the movable member 42, and the linkage mechanism 44. Here, the actuator 48 includes a reversible electric motor unit 48a that is provided on the base member 40. The actuator 48 also includes an actuator driver 48b and an encoder 48c. The actuator 48 is operatively coupled to the linkage 44 for moving the movable member 42 between a plurality of sprocket positions. Here, the movable member 42 is a chain guide. The linkage mechanism 44 is configured to connect the base member 40 to the movable member 42. The linkage mechanism 34 includes a first link 44a and a second link 44b. Each of the first link 44a and the second link 44b has a first end pivotally attached to the base member 40, and a second end pivotally attached to the movable member 42. The base member 40, the movable member 42, the first link 44a and the second link 44b form a four-bar linkage. The encoder 48c is configured to detect an absolute rotational position of a rotational shaft of a motor or a gear reducer of the motor unit 48a. In this way, the position of the movable member 42 with respect to the base member 40 can be determined. Thus, the position of the chain guide of the movable member 42 with respect to the base member 40 can be determined. Thus, the gear position, which of the front chain rings CR1 and CR2 is engaged with the chain CN, of the front derailleur 14B can be readily determined.

As seen in FIG. 1, the operating device 16 includes a shifter. The shifter includes a first operating member 26 and a second operating member 28. A user selectively operates the first operating member 26 and the second operating member 28 to output a shift signal to at least one of the rear derailleur 14A and the front derailleur 14B. In the case of the rear derailleur 14A, the actuator 38 is actuated in response to receiving a shift signal from the operating device 16. The shift signal can be an upshift signal and/or a downshift signal. The actuator 38 then moves the linkage mechanism 34 based on the shift signal from the operating device 16. This movement of the linkage mechanism 34 causes the movably member 32 and the pulley assembly 36 to either move inward towards a vertical center plane of the bicycle B or move outward away from the vertical center plane of the bicycle B. Similarly, in the case of the front derailleur 14B, the actuator 48 is actuated in response to receiving a shift signal from the operating device 16. The actuator 48 then moves the linkage mechanism 44 based on the shift signal from the operating device 16. This movement of the linkage mechanism 44 causes the movably member 42 to either move inward towards a vertical center plane of the bicycle B or move outward away from the vertical center plane of the bicycle B. Thus, this movement of the linkage mechanism 44 causes the chain guide of the movably member 42 to either move inward towards a vertical center plane of the bicycle B or move outward away from the vertical center plane of the bicycle B.

Referring to FIGS. 2 and 3, the bicycle derailleur can further includes an angular sensor that is disposed between the movable member and the pulley assembly for detecting a rotation angle of the pulley assembly with respect to the movable member. Thus, the rear derailleur 14A further includes an angular sensor 50 is disposed between the movable member 32 and the pulley assembly 36 for detecting a rotation angle of the pulley assembly 36 with respect to the movable member 32. For example, the angular sensor 50 is a position sensors such as a potentiometer, a rotary encoder, a resistive position sensor, an intermittent optical sensor, a photo interrupter, contact switches, etc. In any case, the term "sensor" as used herein refers to a hardware device or instrument designed to detect the presence or absence of a particular event, object, substance, or a change in its environment, and to emit a signal in response. The term "sensor" as used herein does not include a human.

Also, the bicycle derailleur can further includes a battery that is disposed to one of the base member, the movable member, and the linkage mechanism. Thus, the bicycle rear derailleur 14A further includes a battery 52 that is disposed to one of the base member 30, the movable member 32, and the linkage mechanism 34. Here, the battery 52 is disposed on the base member 30. However, the battery 52 can be disposed on the linkage mechanism 52. Preferably, the battery 52 is a rechargeable battery. Alternately, the battery 52 can be replaced or used in conjunction with a power supply such as a capacitor, a fuel cell, a solar powered cell, or any other electric power supply. The battery 52 is electrically connected to the bicycle component controller 12A and the actuator 38 to provide electric power to the bicycle component controller 12A and the actuator 38. The bicycle component controller 12A is disposed to at least one of the battery 52 and the rear derailleur 14A. Here, the bicycle component controller 12A is disposed on the base member 30 of the rear derailleur 14A. However, the bicycle component controller 12A can be disposed at least one of the linkage mechanism, and the movable member.

Similarly, the front derailleur 14B further includes a battery 54 that is disposed to one of the base member 40, the movable member 42, and the linkage mechanism 44. Here, the battery 54 is provided on the base member 40. However, the battery 54 can be disposed on the linkage mechanism 52. Preferably, the battery 54 is a rechargeable battery. Alternately, the battery 54 can be replaced or used in conjunction with a power supply such as a capacitor, a fuel cell, a solar powered cell, or any other electric power supply. The battery 54 is electrically connected to the bicycle component controller 12B and the actuator 48 to provide electric power to the bicycle component controller 12B and the actuator 48. The bicycle component controller 12B is disposed to at least one of the battery 54 and the front derailleur 14B. Here, the bicycle component controller 12A is disposed on the base member 30 of the front derailleur 14B.

The operating device 16 further includes a battery 56. Preferably, the battery 56 is a rechargeable battery. Alternately, the battery 56 can be replaced or used in conjunction with a power supply such as a capacitor, a fuel cell, a solar powered cell, or any other electric power supply. The battery 56 is electrically connected to the bicycle component controller 12C to provide electric power to the bicycle component controller 12C.

As seen in FIG. 2, the operating device 16 is configured to wirelessly communicate with the rear derailleur 14A and the front derailleur 14B. In particular, the rear derailleur 14A is provided with a wireless communicator 58A, the front derailleur 14B is provided with a wireless communicator 58B, and the operating device 16 is provided with a wireless communicator 58C. The term "wireless communicator" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, radio frequency identification (RFID), ANT+ communications, or Bluetooth® communications or any other type of signal suitable for short range wireless communications as understood in the bicycle field. Here, each of the wireless communicator 58A and the wireless communicator 58B can be a receiver such as a one-way wireless communication device to receive signals from the operating device 16. Alternatively, each of the wireless communicator 58A and the wireless communicator 58B can be a transceiver such as a two-way wireless communication device so that the wireless communicator 58A and the wireless communicator 58B transmit signals to the operating device 16 and/or other devices. The operating device 16 can be a transmitter such as a one-way wireless communication device so that the wireless communicator 58C transmits signals to the wireless communicator 58A and the wireless communicator 58B. Alternatively, the wireless communicator 58C can be a transceiver such as a two-way wireless communication device so that the wireless communicator 58C receives signals from the rear derailleur 14A, the front derailleur 14B and/or other devices. However, the operating device 16 and the bicycle derailleur can be configured to communicate via an electrical cable.

Here, the bicycle component control system 10 further comprises a non-shifting input device 60 that is configured to select one of the sprocket assembly information of the at least one sprocket assembly for use in determining the gear shift control. For example, the non-shifting input device 60 includes at least one of a cycle computer 60A, a smartphone 60B, a switch 60C provided to a bicycle and a personal computer 60D. The cycle computer 60A, the smartphone 60B, the switch 60C and the personal computer 60D are conventional devices that include a data storage device and a processor. The data storage device of the cycle computer 60A, the smartphone 60B, the switch 60C and/or the personal computer 60D can be prestored with the sprocket assembly information of the sprocket assemblies that is used in determining the gear shift control. Alternatively, the cycle computer 60A, the smartphone 60B, the switch 60C and/or the personal computer 60D can be used to access the sprocket assembly information of the sprocket assemblies that is prestored in at least one of the data storage devices 20A, 20B and 20C. In any case, the user can set the sprocket assembly information which will be used in determining the gear shift control by using the an input device of the cycle computer 60A, the smartphone 60B, the switch 60C and/or the personal computer 60D. The input device can be, for example, at least one of a touch screen, a button, a switch, a keyboard, a mouse, a joystick, etc.

In the embodiment of FIG. 2, the bicycle component controller 12 is configured to wirelessly communicate with the non-shifting input device 60. In other words, one or more of the bicycle component controllers 12A, 12b and 12C is configured to wirelessly communicate with one or more of the cycle computer 60A, the smartphone 60B, the switch 60C and/or the personal computer 60D. For example, a user determines the model of the sprocket assembly CS that is installed on the bicycle B and then selects the model of the sprocket assembly CS using one of the cycle computer 60A, the smartphone 60B, the switch 60C and the personal computer 60D. The cycle computer 60A, the smartphone 60B, the switch 60C or the personal computer 60D then wirelessly communicate the selected model of the sprocket assembly CS that is installed on the bicycle B to the wireless communicator 58A of the rear derailleur 14A. The processor 22A of the rear derailleur 14A then stores the selected model of the sprocket assembly CS in the data storage device 20a of the rear derailleur 14A. Now, when the wireless communicator 58A of the rear derailleur 14A receives a shift command from the wireless communicator 58C of the operating device 16, the processor 22A controls the actuator 38 based on the sprocket assembly information for the selected model of the sprocket assembly CS. Of course, it will be apparent from this disclosure that the same process can be used for controlling the front derailleur 14B based on the selected model of the sprocket assembly FS.

The shift commands for the rear derailleur 14A and the front derailleur 14B can be produced manually using the operating device 16 or automatically based on one or more bicycle conditions. Here, preferably, at least one of the data storage devices 20A, 20B and 20C is provided with an automatic shifting control program that automatically shift the rear derailleur 14A and/or front derailleur 14B when an automatic mode is selected. Alternatively, the automatic shifting control program can be stored in the data storage device of the cycle computer 60A or some other component of the bicycle B. One example of an automatic shifting control is disclosed in U.S. Pat. No. 6,073,061, which is assigned to Shimano Inc. This automatic shifting can be adapted to be used with the bicycle component control system 10 of the present disclosure. In the automatic mode, shifting of each of the rear derailleur 14A and/or front derailleur 14B is preferably at least partially based on at least one of a cadence, a bicycle running speed, a bicycle tilt, and a gear ratio. Thus, the bicycle component control system 10 preferably includes at least one of a speed sensor 62, a cadence sensor 64 and a tilt sensor 66.

The speed sensor 62 is configured to detect information corresponding to the rotational speed of the front wheel FW of the bicycle B. Preferably, the speed sensor 62 is configured to detect a magnet M provided on a spoke of the front wheel FW of the bicycle B. The speed sensor 62 is configured to, for example, output detection signals a predetermined number of times in one rotation of the front wheel FW. The predetermined number of times is, for example, one. The speed sensor 62 outputs a signal corresponding to the rotational speed of the front wheel FW. The bicycle component controller 12 calculates a vehicle speed or forward velocity of the bicycle B based on the rotational speed of the front wheel FW. The forward velocity is calculated based on the rotational speed of the front wheel FW and information related to the perimeter of the front wheel FW. The information related to the perimeter of the front wheel FW is stored in the data storage device 20.

The speed sensor 62 includes, for example, a magnetic reed forming a reed switch or a Hall element. The speed sensor 62 can be attached to the front fork FF and configured to detect the magnet M attached to a spoke of the front wheel FW, or can be provided on a chainstay of the rear frame body RB of the bicycle B and configured to detect a magnet attached to the rear wheel RW. In the present embodiment, the speed sensor 62 is configured so that the reed switch detects the magnet M once in one rotation of the rear wheel RW. The speed sensor 62 can have any configuration that detects information corresponding to the rotational speed of the rear wheel RW of the bicycle B and can include, for example, an optical sensor or an acceleration sensor. The speed sensor 62 is connected to the bicycle component controller 12 via a wireless communication device or can be connected to the bicycle component controller 12 via an electric cable.

The cadence sensor 64 is configured to detect information corresponding to the rotational speed of the crank axle CA1 of the bicycle B. The cadence sensor 64 is provided, for example, on the bicycle frame F of the bicycle B. The cadence sensor 64 is configured to include a magnetic sensor that outputs a signal corresponding to the strength of the magnetic field. An annular magnet having a magnetic field, the strength of which changes in the circumferential direction, is provided on the crank axle CA1, a member that rotates in cooperation with the crank axle CA1, or the power transmission path between the crank axle CA1 and the front sprocket assembly FS. The cadence sensor 64 outputs a signal corresponding to the rotational speed of the crank axle CA1.

The magnet can be provided on a member that rotates integrally with the crank axle CA1 in the power transmission path of the human driving force between the crank axle CA1 and the front sprocket assembly FS. For example, in a case where the first one-way clutch is not provided between the crank axle CA1 and the front sprocket assembly FS, the magnet can be provided on the front sprocket assembly FS. The cadence sensor 64 can have any configuration that detects information corresponding to the rotational speed of the crank axle CA1 of the bicycle B and can include, for example, an optical sensor, an acceleration sensor, or a torque sensor instead of the magnetic sensor. The cadence sensor 64 is connected to the bicycle component controller 12 via a wireless communication device or can be connected to the bicycle component controller 12 via an electric cable.

The tilt sensor 66 is configured to detect information corresponding to lateral inclination of the bicycle B with respect to vertical. Preferably, the tilt sensor 66 includes at least one of a gyro sensor and an acceleration sensor provided to the bicycle frame F. Alternatively, the tilt sensor 66 can include a GPS receiver and map information including information related to road gradient that is stored in the data storage device 20.

Now, the shifting process will be discussed in more detail. For the sake of simplicity, the following description of the bicycle component control system 10 will focus on the bicycle component controller 12A controlling the rear derailleur 14A in either manual control mode or in automatic control mode. As mentioned above, in manual control mode, the processor 22A is configured to perform the gear shift control in response to a manual input using the operating device 16. In other words, the processor 22A is configured to perform the gear shift control response to a manual input which is input to a shifter. Thus, here, the processor 22A is configured to perform the gear shift control response to a manual input from the operating device 16. On the other hand, Thus, in automatic control mode, the processor 22A is configured to automatically perform the gear shift control based on at least one of a cadence, a bicycle running speed, a bicycle tilt, and a gear ratio.

In both manual control mode and automatic control mode, the processor 22A is configured to perform a gear shift control based on the sprocket assembly information. The sprocket assembly information is stored in the data storage device 20A. The sprocket assembly information of the at least one sprocket assembly CS at least includes a total sprocket number and shifting gate information. A single shifting distance of the sprocket assembly information corresponds to an axial spacing between adjacent sprockets of the at least one sprocket assembly CS.

For the rear sprocket assembly CS of FIGS. 5 and 6, the sprocket assembly information includes a total sprocket number of nine, a shifting gate information of a single downshifting gate G-down for each of the rear sprockets S2 to S9 and a single upshifting gate G-up for each of the rear sprockets S2 to S9, and single shifting distances D1 to D8.

Figure 7:
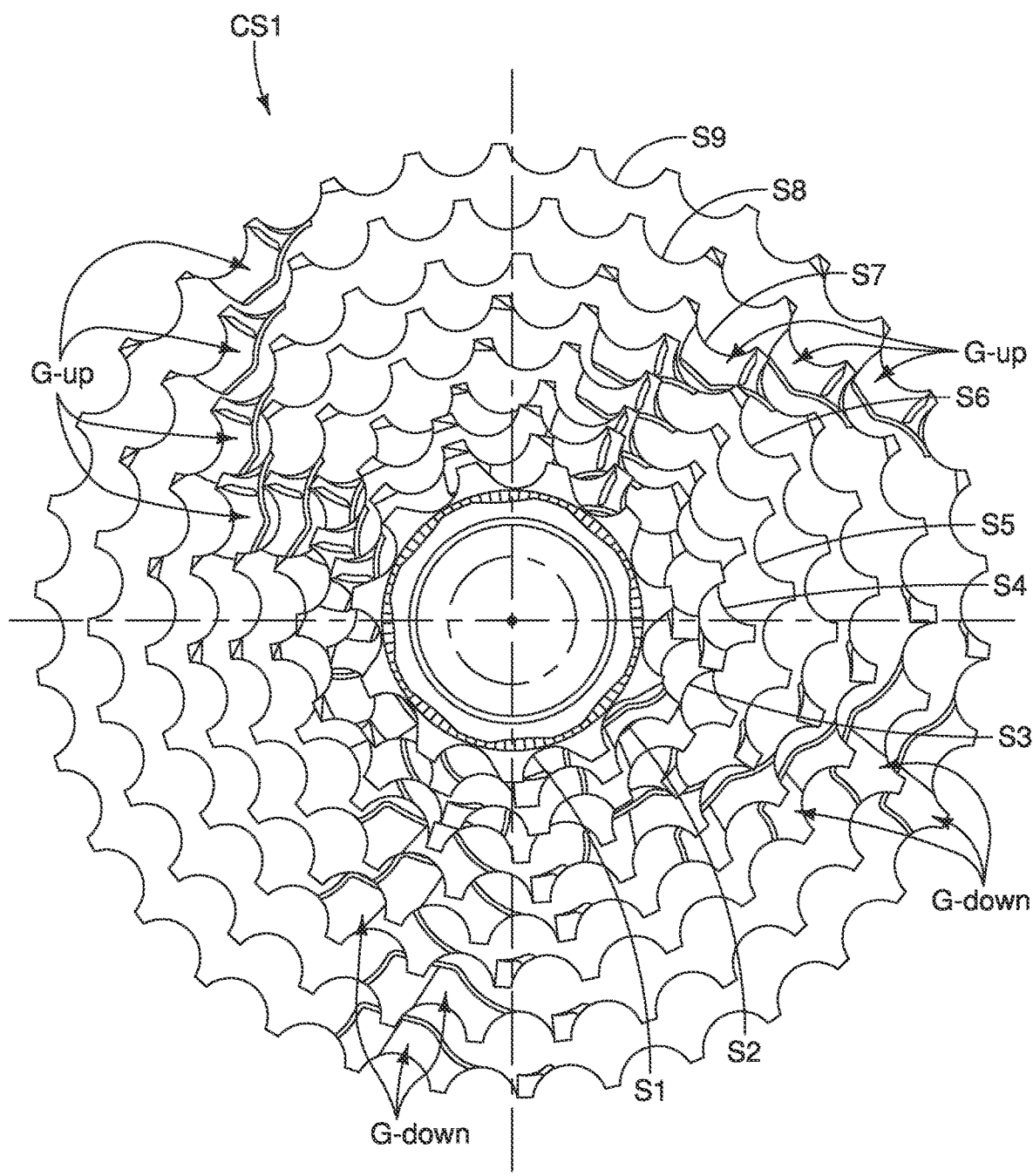
FIG. 7 is a side elevational view of a second sprocket assembly for the bicycle illustrated in FIG. 1.

For the rear sprocket assembly CS1 of FIG. 7, the sprocket assembly information includes a total sprocket number of nine, a shifting gate information of two downshifting gates G-down for each of the rear sprockets S2 to S9 and two upshifting gates G-up for each of the rear sprockets S2 to S9, and single shifting distances between the rear sprockets S2 to S9. The single shifting distances of the rear sprocket assembly CS1 can be the same as for the rear sprocket assembly CS, but could be different.

Figure 8:
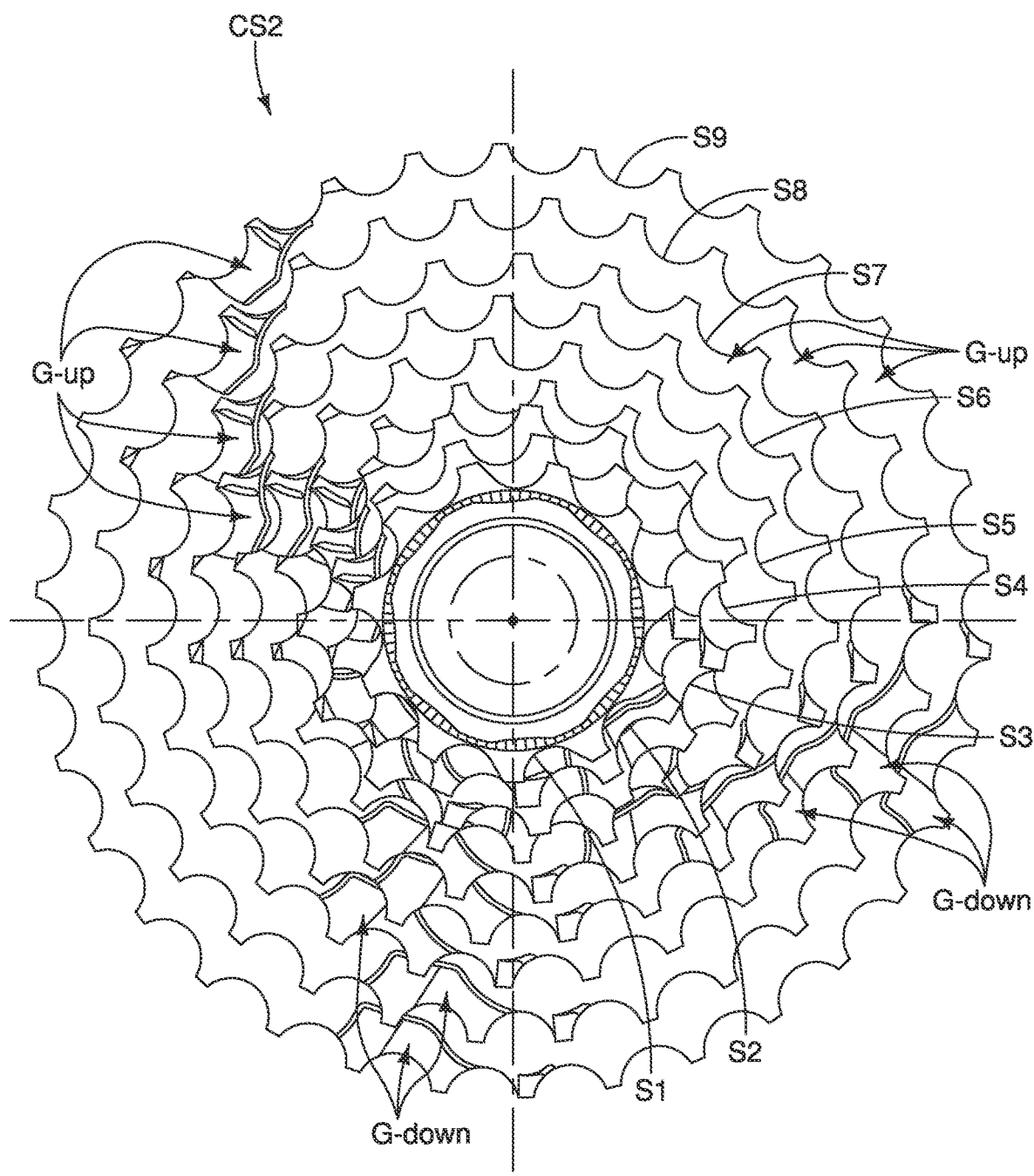
FIG. 8 is a side elevational view of a third sprocket assembly for the bicycle illustrated in FIG. 1.
Figure 9:
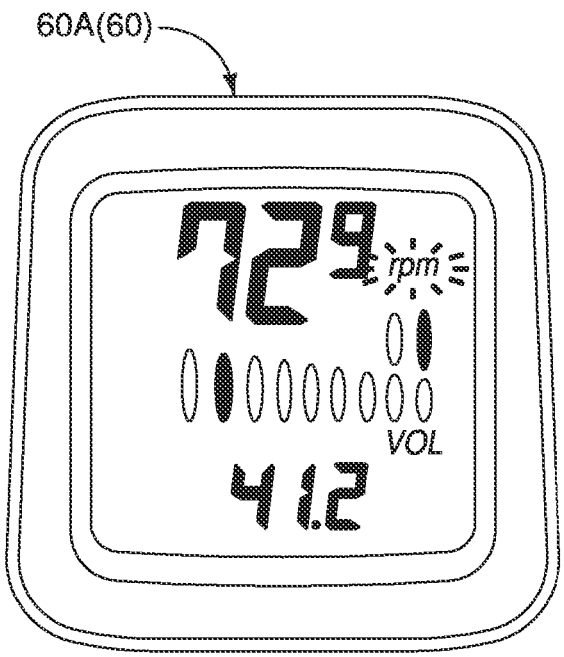
FIG. 9 is an enlarged top plan view of an LCD display unit of the cycle computer in a normal operating mode in which an "Informational" display screen is displayed.

For the rear sprocket assembly CS2 of FIG. 8, the sprocket assembly information includes a total sprocket number of nine, a shifting gate information of two downshifting gates G-down for each of the rear sprockets S2 to S9 and a single upshifting gate G-up for each of the rear sprockets S2 to S9, and single shifting distances between the rear sprockets S2 to S9. The single shifting distances of the rear sprocket assembly CS2 can be the same as for the rear sprocket assembly CS, but could be different.

A first scenario will now be discussed in which a double downshift command is received by the bicycle component controller 12A to control the rear derailleur 14A. The double downshift command can be either manually inputted or automatically generated based on at least one bicycle condition. Downshifting occurs when the rear derailleur 14A shifts the chain CN from a smaller sprocket to a neighboring larger sprocket that is the next adjacent larger sprocket. In response to receiving a double downshift command, if the shifting gate information indicates that each of the sprockets of the at least one sprocket assembly includes a single downshifting gate G-down except for a smallest sprocket of the at least one sprocket assembly, the processor 22A is configured to perform the gear shift control. In the illustrated embodiment, the processor 22A is configured to perform the gear shift control based on the shifting gate information of the rear sprocket assembly CS. In this case, the gear shift control includes performing a first downshifting operation corresponding to the single shifting distance. For example, the single shifting distance corresponds to one of the single shifting distances D1 to D8. The processor 22A then waits a first predetermined period P1 after completing the first downshifting operation, and then performs a second downshifting operation corresponding to the single shifting distance. For example, the single shifting distance corresponds to one of the single shifting distances D1 to D8. Here, the first predetermined period P1 is set based on at least one of a time T1, a rear sprocket rotational angle RA1, and a bicycle running distance RD1. For example, the time T1 for the first predetermined period P1 can be set to one second, the rear sprocket rotational angle RA1 for the first predetermined period P1 can be set to one rotation of the rear sprocket assembly CS, and the bicycle running distance RD1 for the first predetermined period P1 can be set to two meters. In any case, the first predetermined period P1 is preferably set based on the shifting gate information of the sprocket assembly that is being used. In the illustrated embodiment, the first predetermined period P1 is based on the shifting gate information of the rear sprocket assembly CS. Preferably, the rear sprocket rotational angle RA1 is calculated from a crank cadence and a transmission gear ratio. The crank cadence is determined by the cadence sensor 64, while the transmission gear ratio can be determined based on the gear positions of the rear derailleur 14A and the front derailleur 14B using the encoders 38c and 48c.

A second scenario will now be discussed in which a double upshift command is received by the bicycle component controller 12A to control the rear derailleur 14A. The double upshift command can be either manually inputted or automatically generated based on at least one bicycle condition. Upshifting occurs when the rear derailleur 14A shifts the chain CN from a larger sprocket to a neighboring smaller sprocket that is the next adjacent smaller sprocket. In response to receiving a double upshift command, if the shifting gate information indicates that a larger sprocket of the adjacent sprockets of the at least one sprocket assembly is free of an up shifting gate, the processor 22A is configured to perform the gear shift control including performing an upshifting operation corresponding to a double shifting distance. For example, the double shifting distance corresponds to the sum of two adjacent ones of the single shifting distances D1 to D8. In this case, where the larger sprocket of the current sprocket has no upshifting gate, the double upshifting operation does not include a waiting operation between the first upshifting operation and the second upshifting operation.

A third scenario will now be discussed in which a double upshift command is received by the bicycle component controller 12A to control the rear derailleur 14A. In response to receiving a double upshift command, if the shifting gate information indicates that each of the sprockets of the at least one sprocket assembly includes a single up shifting gate G-up except for a smallest sprocket of the at least one sprocket assembly, the processor 22A is configured to perform the gear shift control. In the illustrated embodiment, the at least one sprocket assembly corresponds to the rear sprocket assembly CS. The term "a single upshifting gate" as used herein means that the sprocket does not have two or more upshifting gate, but rather only one upshifting gate. In this case, the gear shift control includes performing a first upshifting operation corresponding to the single shifting distance. As mentioned above, the single shifting distance corresponds to one of the single shifting distances D1 to D8. The processor 22A then waits a second predetermined period P2 after completing the first upshifting operation, and then performs a second upshifting operation corresponding to the single shifting distance. Again, the single shifting distance corresponds to one of the single shifting distances D1 to D8. Here, the second predetermined period P2 is set based on at least one of a time T2, a rear sprocket rotational angle RA2, and a bicycle running distance RD. For example, the time T2 for the second predetermined period P2 can be set to one-half second, the rear sprocket rotational angle RA2 for second predetermined period P2 can be set to one-half rotation of the rear sprocket assembly CS, and the bicycle running distance RD2 for second predetermined period P2 can be set to one meter. Preferably, where the sprockets correspond to the second scenario and the third scenario, the first predetermined period P1 is larger than the second predetermined period P2. In any case, the second predetermined period P2 is preferably set based on the shifting gate information of the sprocket assembly that is being used. In the illustrated embodiment, the second predetermined period P2 is set based on the shifting gate information of the rear sprocket assembly CS.

A fourth scenario will now be discussed in which a double downshift command is received by the bicycle component controller 12A to control the rear derailleur 14A. In response to receiving a double downshift command, if the shifting gate information indicates that each of the sprockets of the at least one sprocket assembly includes at least two downshifting gates G-down except for a smallest sprocket of the at least one sprocket assembly, the processor 22A is configured to perform the gear shift control. In the illustrated embodiment, the processor 22A is configured to perform the gear shift control based on the shifting gate information of the rear sprocket assembly CS. In this case, the gear shift control includes performing a first downshifting operation corresponding to the single shifting distance. Again, the single shifting distance corresponds to one of the single shifting distances D1 to D8. The processor 22A then waits the first predetermined period P1 after completing the first downshifting operation, and then performs a second downshifting operation corresponding to the single shifting distance. Again, the single shifting distance corresponds to one of the single shifting distances D1 to D8. In the fourth scenario, the first predetermined period P1 can be the same as the first predetermined period P1 for the second scenario. Alternatively, the first predetermined period P1 of the fourth scenario can be set to a different value from the first predetermined period P1 of the second scenario.

A fourth scenario will now be discussed in which a double upshift command is received by the bicycle component controller 12A to control the rear derailleur 14A. In response to receiving a double upshift command, if the shifting gate information indicates that each of the sprockets of the at least one sprocket assembly includes at least two upshifting gates G-up except for a smallest sprocket of the at least one sprocket assembly, the processor 22A is configured to perform the gear shift control. In the illustrated embodiment, the processor 22A is configured to perform the gear shift control based on the shifting gate information of the rear sprocket assembly CS. In this case, the gear shift control includes performing a first upshifting operation corresponding to the single shifting distance. Again, the single shifting distance corresponds to one of the single shifting distances D1 to D8. The processor 22A then waits the second predetermined period P2 after completing the first upshifting operation, and then performs a second upshifting operation corresponding to the single shifting distance. Again, the single shifting distance corresponds to one of the single shifting distances D1 to D8. Preferably, the sprockets correspond to the third scenario and the fourth scenario, the first predetermined period P1 is equal to the second predetermined period P2 where a total number of the upshifting gates G-up is equal to a total number the downshifting gates G-down.

Accordingly, a bicycle component control method can be carried out using the bicycle component control system 10. The bicycle component control method comprises providing the bicycle with the bicycle component control system 10, then selecting the at least one sprocket assembly by using the non-shifting input device 60, and transmitting the sprocket assembly information of the at least one sprocket assembly selected with the non-shifting input device 60 to the bicycle component controller 12 for setting the bicycle component. In the illustrated embodiments, the bicycle component control method controls the rear derailleur 14A using the bicycle component controller 12A based on sprocket assembly information of the rear sprocket assembly CS. Thus, in the illustrated embodiments, at least one sprocket assembly corresponds to the rear sprocket assembly CS, and the non-shifting input device 60 corresponds to one of the cycle computer 60A, the smartphone 60B, the switch 60C and the personal computer 60D.

Figure 10:
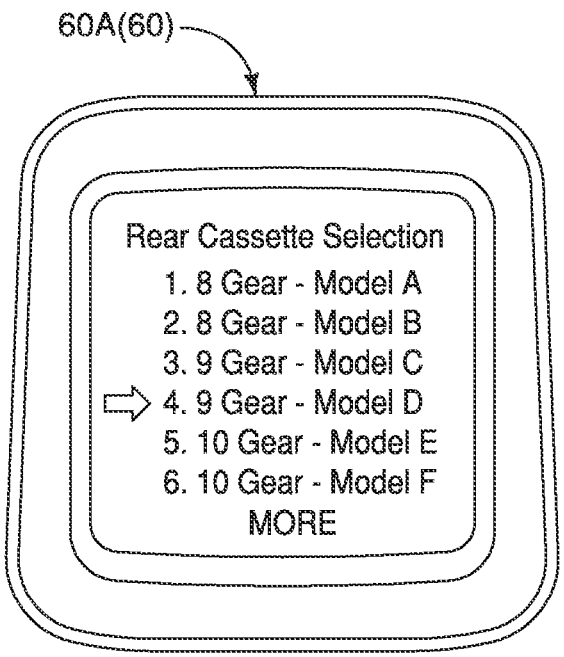
FIG. 10 is an enlarged top plan view of an LCD display unit of the cycle computer in a rear cassette setup mode in which a "Rear Cassette Selection" display screen is displayed.
Figure 11:
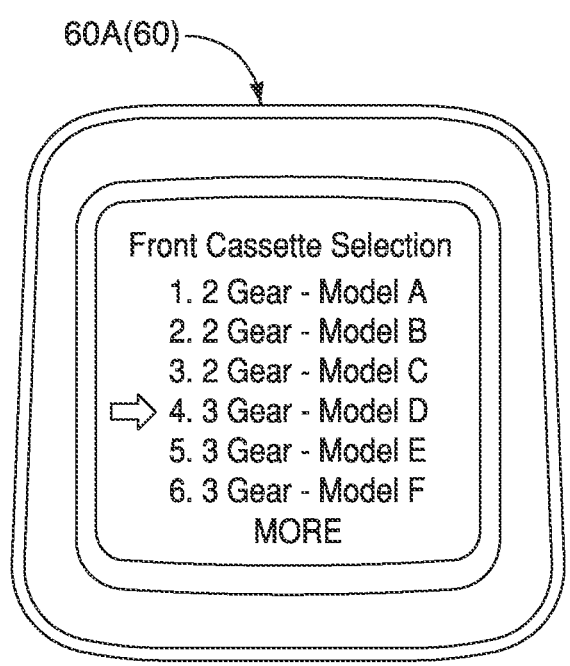
FIG. 11 is an enlarged top plan view of an LCD display unit of the cycle computer in a front crankset setup mode in which a "Front Crankset Selection" display screen is displayed.

In the illustrated embodiments, the selecting of the at least one sprocket assembly is performed by selecting a model of the at least one sprocket assembly using the non-shifting input device. For example, a user can select the sprocket assembly that is being used by search a database that is prestored in memory, and then selecting the model that is being used. In other words, the selecting of the at least one sprocket assembly is performed by selecting a model of the at least one sprocket assembly using the non-shifting input device 60. The cycle computer 60A, the smartphone 60B, the switch 60C and the personal computer 60D are examples of the input device 60. For example, as seen in FIGS. 10 and 11, the cycle computer 60A can have a list of prestored sprocket assemblies that the user can select the model of the sprocket assembly that is being used.

Figure 12:
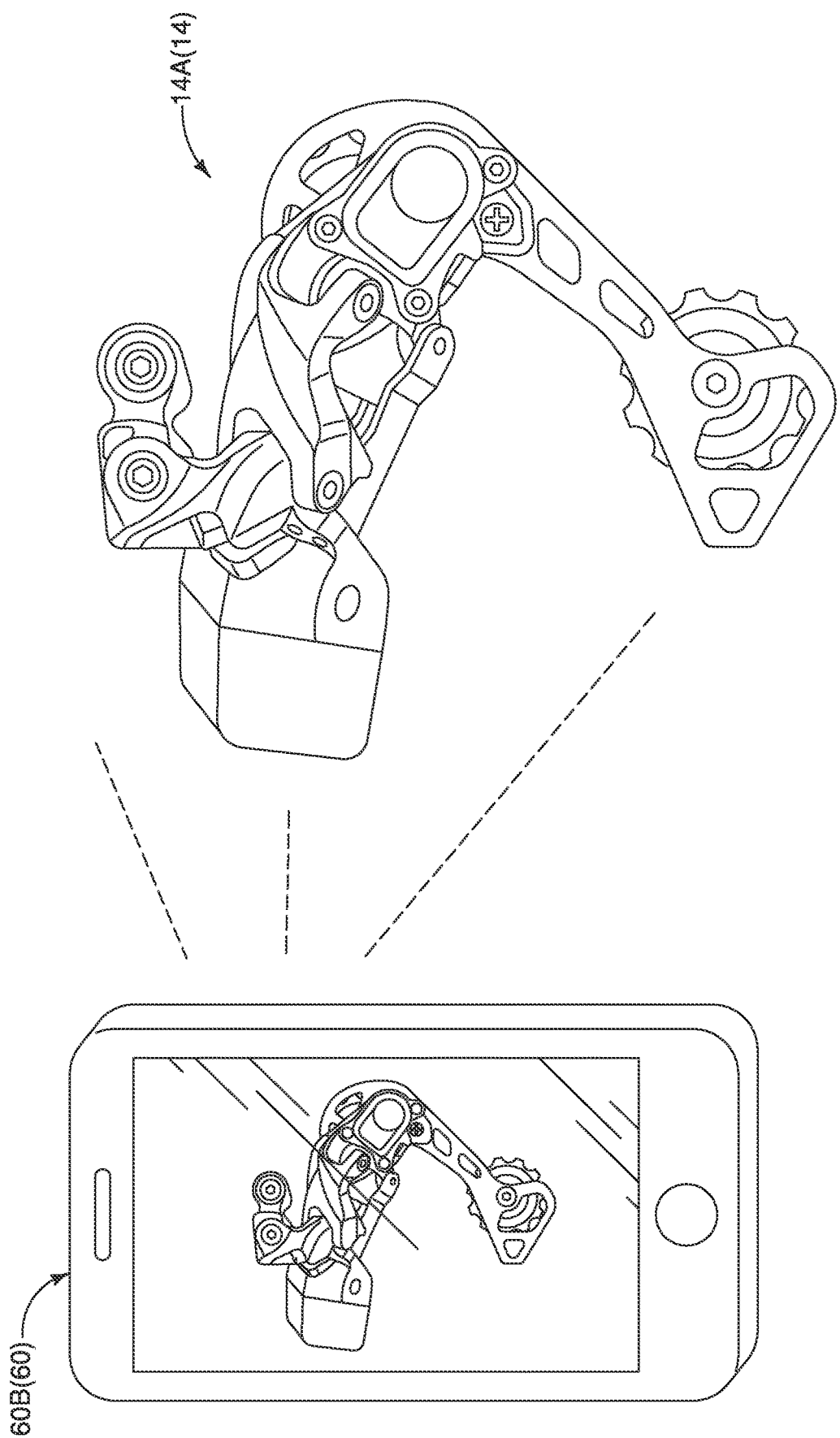
FIG. 12 is a diagrammatic illustration of an external mobile device, such as a smartphone, capturing an image of the rear derailleur.
Figure 13:
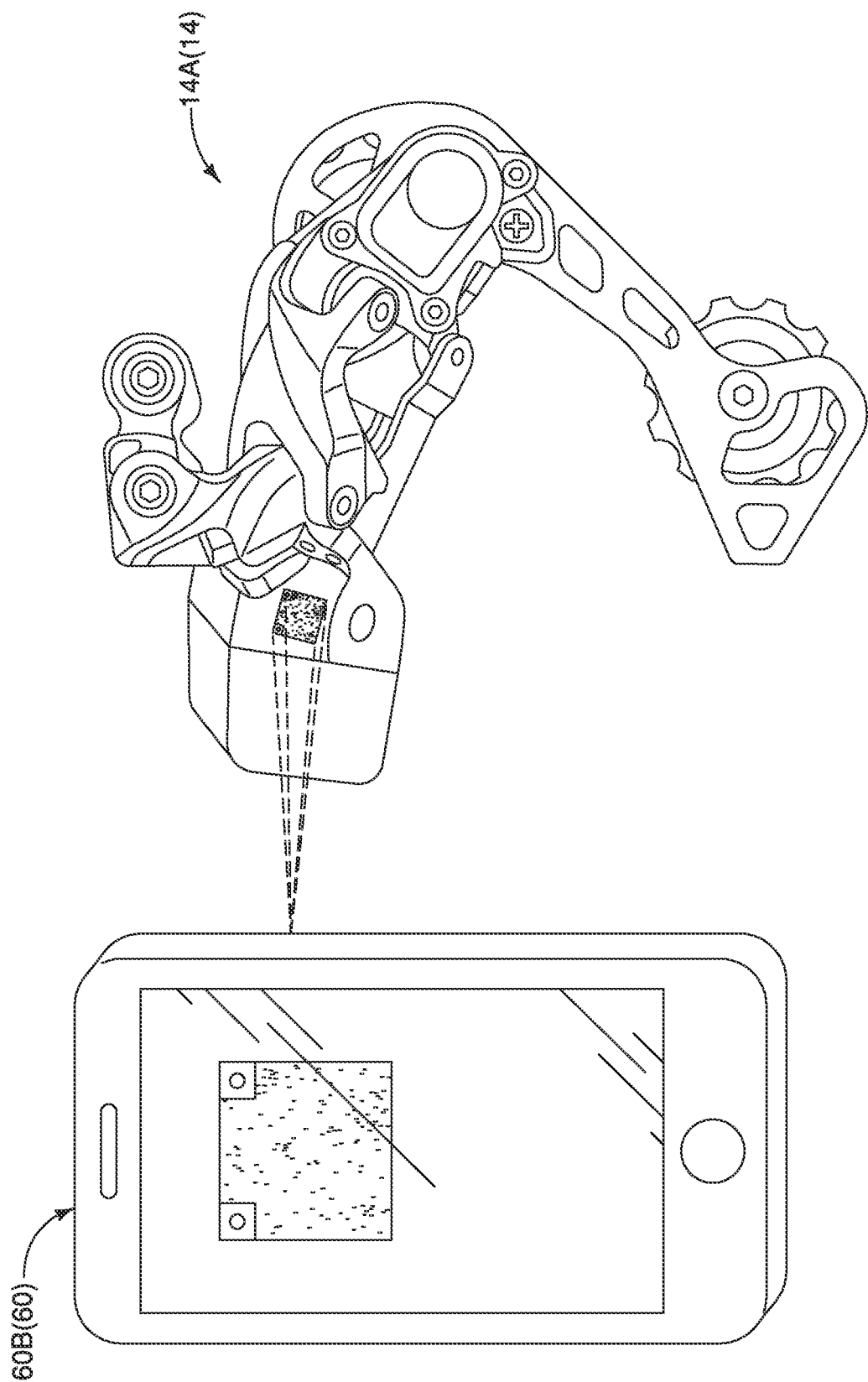
FIG. 13 is a diagrammatic illustration of an external mobile device, such as a smartphone, scanning a QR code of the rear derailleur.

As seen in FIGS. 12 and 13, alternatively, the selecting of the at least one sprocket assembly is performed by scanning or taking a picture of indication representing a model of the at least one sprocket assembly using the non-shifting input device. FIG. 12 shows the example of taking a picture of the rear derailleur 14A taken by the smartphone 60B. The picture of the rear derailleur 14A then can be compared to other images stored in the smartphone 60B or at a remote location such as a cloud server. While the picture includes the entire image of the rear derailleur 14A, it is possible to take a picture of only a portion of the rear derailleur 14A or of packaging in which the rear derailleur 14A came in. FIG. 13 shows the smartphone 60B scanning a QR code that is provided on the rear derailleur 14A. However, the smartphone 60B can scan other types of indica such as barcodes, serial number, model numbers, etc. These selection methods can all be provided to a user and the user then selects which method to use.

Figure 14:
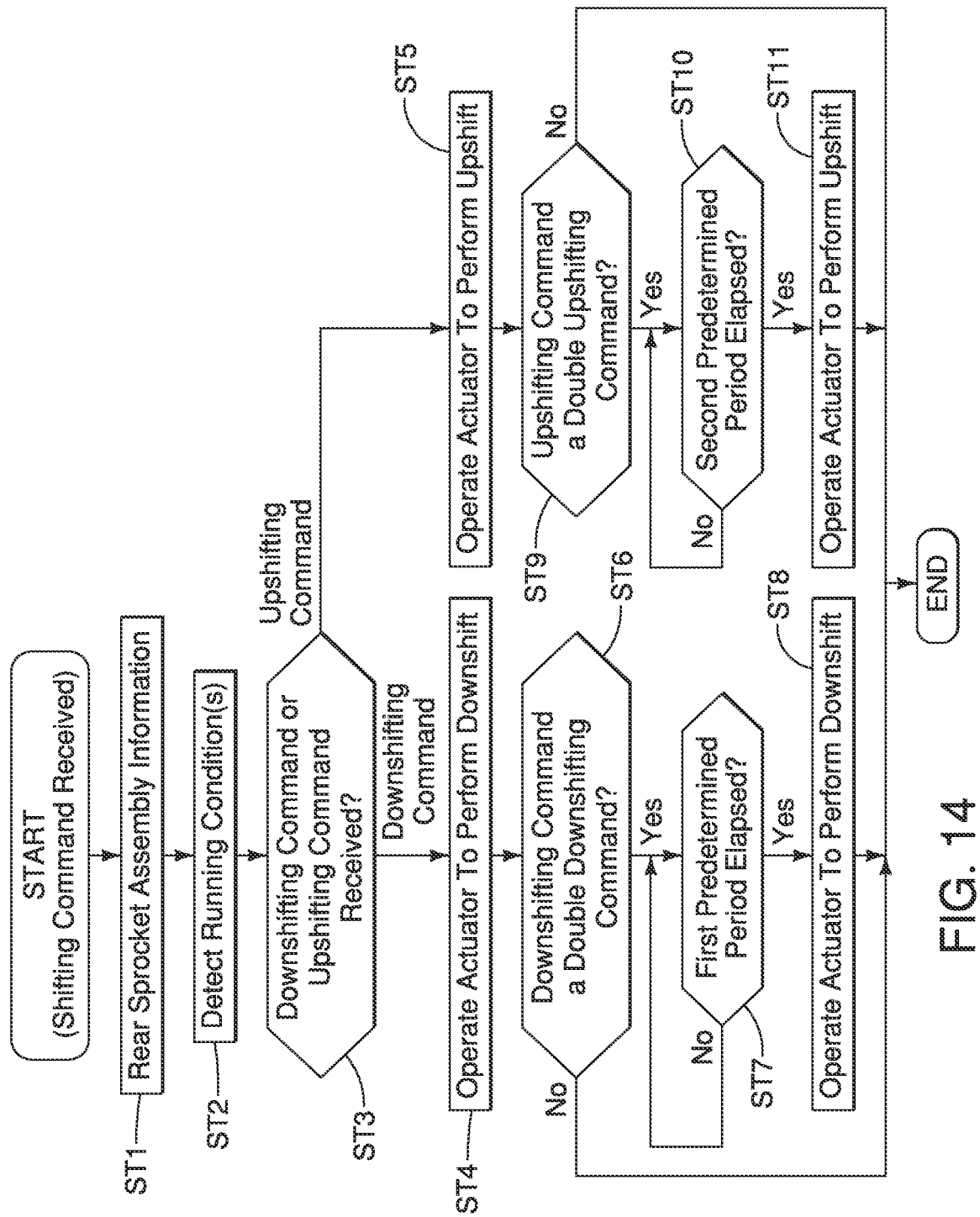
FIG. 14 is a flowchart of a gear shift control process executes by the bicycle component controller for performing a shifting operation.

Referring now to FIG. 14, a flowchart illustrates a gear shift control process that is executed by for carrying out a shift operation. This gear shift control process is started upon receiving a shifting command either automatically or manually by a user operating the operating device 16. In FIG. 14, the gear shift control process is executed by the processor 22A of the rear derailleur 14A. However, the gear shift control process can be executed by a processor that is remotely located with respect to the rear derailleur 14A. Moreover, the gear shift control process is executed by the processor 22B to control the front derailleur 14B. For the sake of brevity, the gear shift control process will only be discussed with respect to controlling the rear derailleur 14A.

In step ST1, the processor 22A reads the sprocket assembly information for the rear sprocket assembly CS after receiving a shifting command. Then, the process proceeds to step ST2.

In step ST2, the processor 22A receives the detected running conditions of the bicycle B from the various sensors such as the speed sensor 62, the cadence sensor 64 and the tilt sensor 66. Then, the process proceeds to step ST3.

In step ST3, the processor 22A determines whether the shifting command is a downshifting command or an upshifting command. In the case of a downshifting command, the process proceeds to step ST4. In the case of an upshifting command, the process proceeds to step ST5.

In step ST4, the processor 22A operates the actuator 38 to perform a single downshift. Then, the process proceeds to step ST6.

In step ST5, the processor 22A operates the actuator 38 to perform a single upshift. Then, the process proceeds to step ST9.

In step ST6, the processor 22A determines whether the shifting command is a double downshifting command. In the case of a single downshifting command, the process ends. In the case of a double downshifting command, the process proceeds to step ST7.

In step ST7, the processor 22A determines whether the first predetermined period P1 has elapsed. The first predetermined period P1 is set based on the sprocket assembly information and/or the detected running conditions. The first predetermined period P1 can be different for each of the sprockets or the same for each of the sprockets depending on the configuration of the sprocket assembly CS. The first predetermined period P1 can be set to zero where the sprocket assembly information indicates that there are no downshifting gates for shifting to the next larger sprocket. In other words, the current sprocket is free of a downshifting gate. Hence, there is no wait time for the double downshifting where the current sprocket is free of a downshifting gate. However, if the sprocket assembly information indicates that at least one downshifting gate exists for shifting to the next larger sprocket, then the first predetermined period P1 is a value greater than zero. After the first predetermined period P1 has elapsed, the process proceeds to step ST7.

In step ST8, the processor 22A operates the actuator 38 to perform a single downshift. Then, the process ends.

In step ST9, the processor 22A determines whether the shifting command is a double upshifting command. In the case of a single upshifting command, the process ends. In the case of a double upshifting command, the process proceeds to step ST10.

In step ST10, the processor 22A determines whether the second predetermined period P2 has elapsed. The second predetermined period P2 is set based on the sprocket assembly information and/or the detected running conditions. The second predetermined period P2 can be different for each of the sprockets or the same for each of the sprockets depending on the configuration of the sprocket assembly CS. The second predetermined period P2 is set to zero where the sprocket assembly information indicates that there are no upshifting gates for shifting to the next smaller sprocket. In other words, the current sprocket is free of an upshifting gate. Hence, there is no wait time for the double upshifting where the current sprocket is free of a downshifting gate. However, if the sprocket assembly information indicates that at least one upshifting gate exists for shifting to the next larger sprocket, then the second predetermined period P2 is a value greater than zero. After the second predetermined period P2 has elapsed, the process proceeds to step ST11.

In step ST11, the processor 22A operates the actuator 38 to perform a single upshift. Then, the process ends.

Figure 15:
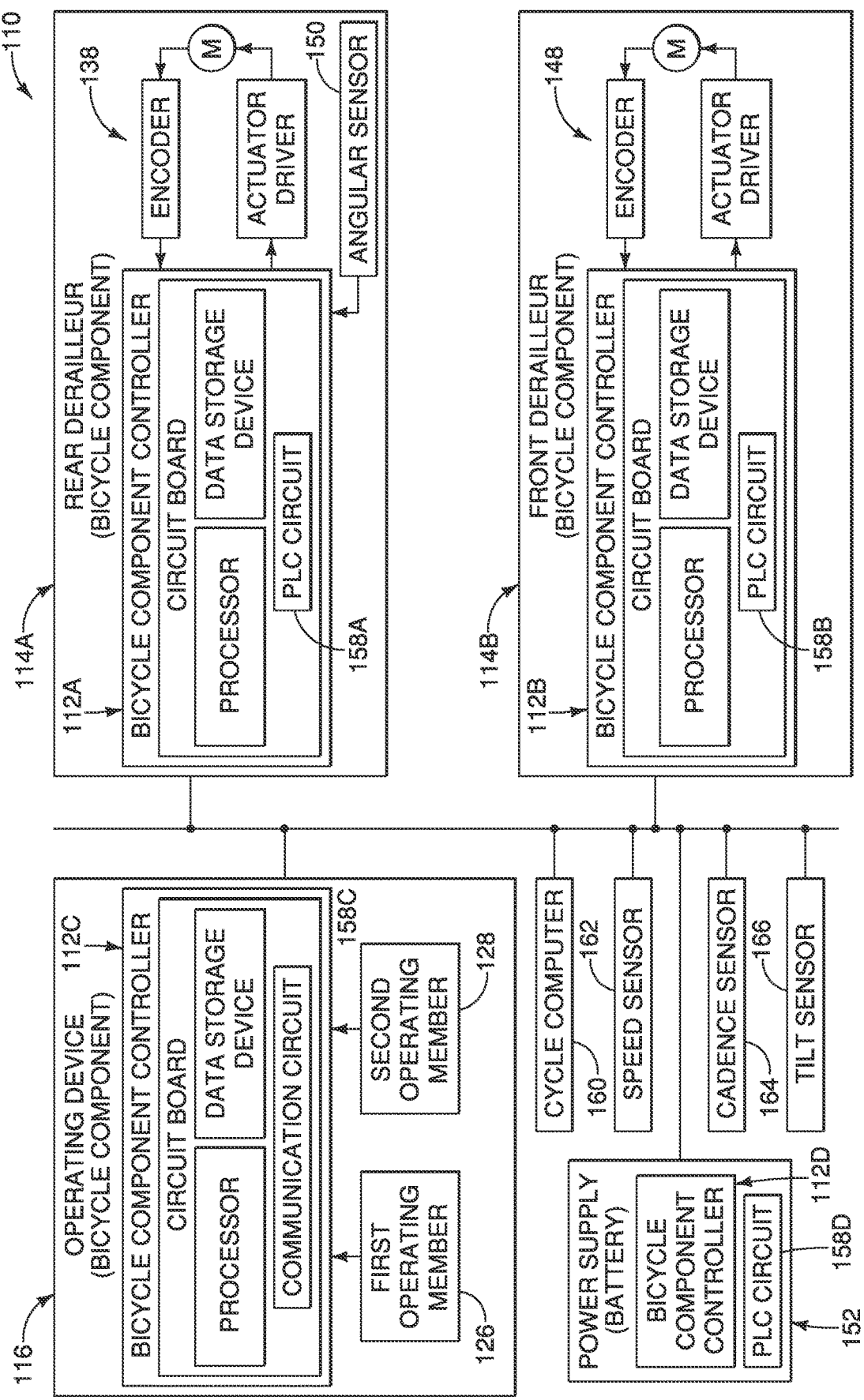
FIG. 15 is an overall schematic diagram of a bicycle component control system in accordance with an alternate embodiment.

Referring now to FIG. 15, a bicycle component control system 110 is illustrated. Basically, the bicycle component control system 110 includes a rear derailleur 114A, a front derailleur 114B and an operating device 116. Here, the bicycle component control system 110 used wired communications to communicate between the various components. For example, each of the components of the bicycle component control system 110 includes a power line communication (PLC) circuit such that the components of the bicycle component control system 110 communicate over a power line. In view of the similarity between the bicycle component control system 110 and the bicycle component control system 10, the descriptions of the parts of the second embodiment that are identical to the parts of the first embodiment may be omitted for the sake of brevity.

Thus, the rear derailleur 114A, the front derailleur 114B and the operating device 116 are identical to the rear derailleur 14A, the front derailleur 14B and the operating device 16, respectively, except that the wireless communicators have been replaced with the power line communication (PLC) circuits. Thus, from an electrical component point of view, the rear derailleur 114A includes a bicycle component controller 112A, an actuator 138, an angular sensor 150 and a PLC circuit 158A. Similar, from an electrical component point of view, the front derailleur 114B includes a bicycle component controller 112B, a first operating member 126, a second operating member 128, and a PLC circuit 158B. Also, from an electrical component point of view, the operating device 116 includes a bicycle component controller 112G, an actuator 148 and a PLC circuit 158C. Structurally, the rear derailleur 114A, the front derailleur 114B and the operating device 116 are identical to the rear derailleur 14A, the front derailleur 14B and the operating device 16.

Also, the bicycle component control system 210 further comprises a battery 152 that configured to be disposed to the bicycle frame F. The battery 152 is electrically connected to the bicycle derailleur. In the illustrated embodiment, the battery 152 is electrically connected to the rear derailleur 114A and the front derailleur 214B. Here, the battery 152 is electrically connected to all of the components for supplying power to all of the components as seen in FIG. 15. The battery 152 includes a bicycle component controller 112D and a PLC circuit 158D. Similar to the prior embodiment, the bicycle component control system 110 further comprises a cycle computer 160 that is configured to select one of the sprocket assembly information of the at least one sprocket assembly for use in determining the gear shift control. The cycle computer 160 is an example of a non-shifting input device. Thus, the bicycle component controller 112A is configured to communicate with the non-shifting input device via a wire. In particular, the cycle computer 160 is configured to communicate with the non-shifting input device via a wire. Likewise, the bicycle component controllers 112B and 112C are configured to communicate with the non-shifting input device via a wire. Thus, the bicycle component controllers 112B and 112C are configured to communicate with the cycle computer 160 via a wire.

Figure 16:
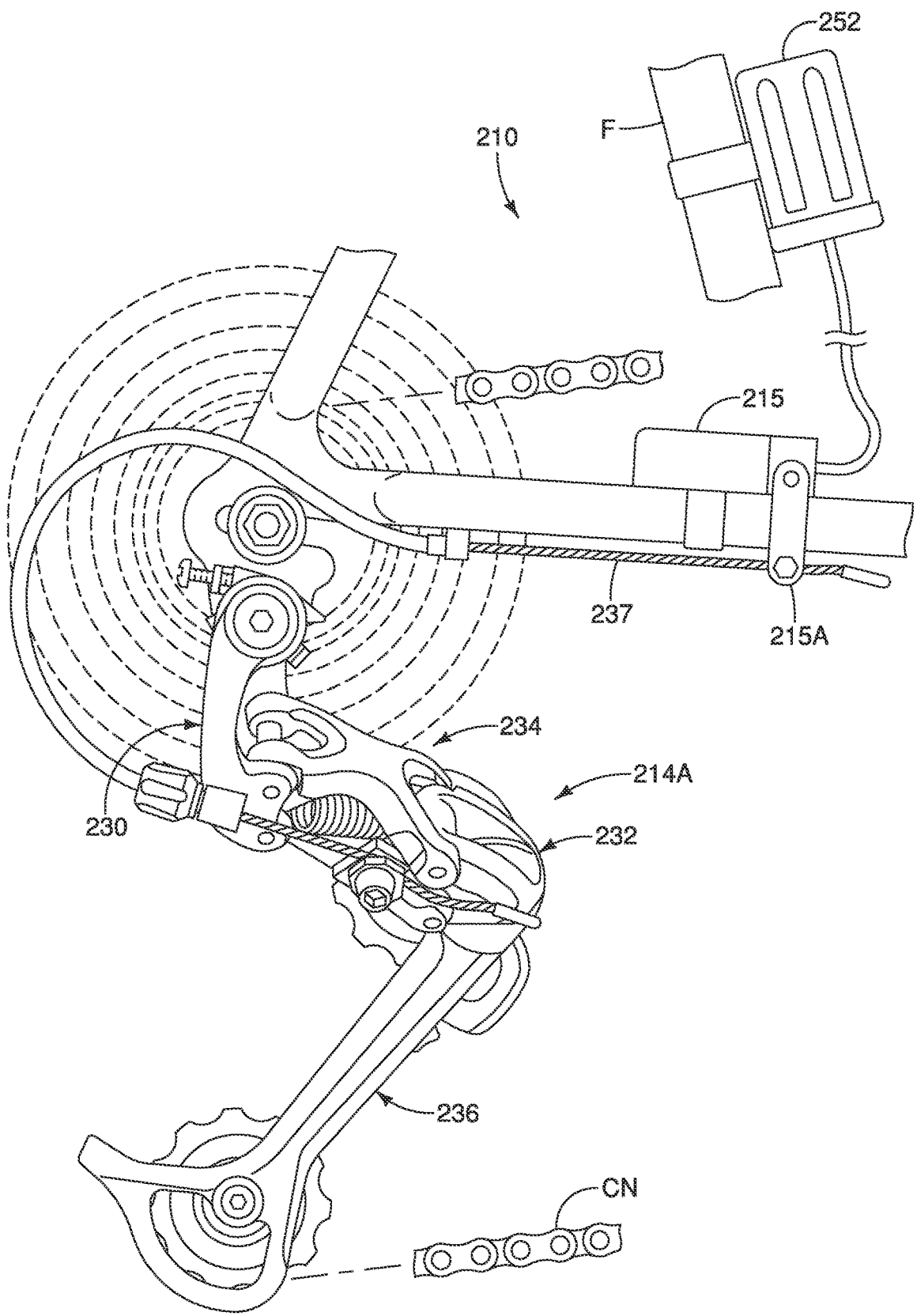
FIG. 16 is a side elevational view of a rear derailleur and an actuator disposed to a bicycle frame such that the actuator operates a cable that is connected to the rear derailleur for operating the rear derailleur.

Referring now to FIG. 16, a portion of a bicycle component control system 210 is illustrated that includes a rear derailleur 214A in accordance with another embodiment. The bicycle component control system 210 is identical to the bicycle component control system 110, except that the rear derailleur 114A has been replaced with the rear derailleur 214A and an actuator 215.

The rear derailleur 214A includes a base member 230, a movable member 232, a linkage mechanism 234 and a pulley assembly 236. The base member 230 is configured to be mounted to the bicycle frame F. The movable member 232 is movable relative to the base member 230. The linkage mechanism 234 is configured to connect the base member 230 to the movable member 232. The pulley assembly 236 is rotatably connected to the movable member 232. Here, a cable 237 is coupled between the linkage mechanism 234 and the actuator 215. The actuator 215 is configured to be disposed to the bicycle frame F, and the actuator 215 operates the cable 237 that is connected to the bicycle derailleur 214A for operating the bicycle derailleur 214A. Here, the actuator 215 is a reversible electric motor unit that pivots a control link 215A to pull and release the cable 237.

The bicycle component control system 210 further comprises a battery 252 that configured to be disposed to the bicycle frame F. The battery 252 is electrically connected to the actuator 215 for controlling the rear derailleur 214A via the control link 215A. The battery 252 is electrically connected to the other components that are shown in FIG. 16 by power line communication. Thus, the actuator 215 can be controlled by anyone of the bicycle component controllers of the other bicycle components to carry out the gear shift control as discussed above. Alternatively, the actuator 215 can be provided with its own bicycle component controller for carrying out the gear shift control as discussed above.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle component. Accordingly, these directional terms, as utilized to describe the bicycle component should be interpreted relative to a bicycle in an upright riding position on a horizontal surface and that is equipped with the bicycle component. The terms "left" and "right" are used to indicate the "right" when referencing from the right side as viewed from the rear of the bicycle, and the "left" when referencing from the left side as viewed from the rear of the bicycle.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component controller comprising:
a processor configured to perform a gear shift control based on a sprocket assembly information of at least one sprocket assembly, wherein
the sprocket assembly information at least includes a single shifting distance and shifting gate information, and wherein
the single shifting distance corresponds to an axial spacing between adjacent sprockets of the at least one sprocket assembly.

2. The bicycle component controller according to claim 1, wherein
in response to receiving a double downshift command, if the shifting gate information indicates that each of the sprockets of the at least one sprocket assembly includes a single downshifting gate except for a smallest sprocket of the at least one sprocket assembly, the processor is configured to perform the gear shift control including:
performing a first downshifting operation corresponding to the single shifting distance,
waiting a first predetermined period after completing the first downshifting operation, and
performing a second downshifting operation corresponding to the single shifting distance.

3. The bicycle component controller according to claim 2, wherein
the first predetermined period is set based on at least one of a time, a rear sprocket rotational angle, and a bicycle running distance.

4. The bicycle component controller according to claim 3, wherein
the rear sprocket rotational angle is calculated from a crank cadence and a transmission gear ratio.

5. The bicycle component controller according to claim 1, wherein
in response to receiving a double upshift command, if the shifting gate information indicates that a larger sprocket of the adjacent sprockets of the at least one sprocket assembly is free of an upshifting gate, the processor is configured to perform the gear shift control including performing an upshifting operation corresponding to a double shifting distance.

6. The bicycle component controller according to claim 1, wherein
in response to receiving a double upshift command, if the shifting gate information indicates that each of the sprockets of the at least one sprocket assembly includes a single upshifting gate except for a smallest sprocket of the at least one sprocket assembly, the processor is configured to perform the gear shift control including:
performing a first upshifting operation corresponding to the single shifting distance,
waiting a second predetermined period after completing the first upshifting operation, and
performing a second upshifting operation corresponding to the single shifting distance.

7. The bicycle component controller according to claim 6, wherein
the first predetermined period is larger than the second predetermined period.

8. The bicycle component controller according to claim 1, wherein
in response to receiving a double downshift command, if the shifting gate information indicates that each of the sprockets of the at least one sprocket assembly includes at least two downshifting gates except for a smallest sprocket of the at least one sprocket assembly, the processor is configured to perform the gear shift control including:
performing a first downshifting operation corresponding to the single shifting distance,
waiting a first predetermined period after completing the first downshifting operation, and
performing a second downshifting operation corresponding to the single shifting distance.

9. The bicycle component controller according to claim 8, wherein
in response to receiving a double upshift command, if the shifting gate information indicates that each of the sprockets of the at least one sprocket assembly includes a single upshifting gate except for a smallest sprocket of the at least one sprocket assembly, the processor is configured to perform the gear shift control including:
performing a first upshifting operation corresponding to the single shifting distance, waiting a second predetermined period after completing the first upshifting operation, and performing a second upshifting operation corresponding to the single shifting distance.

10. The bicycle component controller according to claim 9, wherein the first predetermined period is larger than the second predetermined period.

11. The bicycle component controller according to claim 8, wherein in response to receiving a double upshift command, if the shifting gate information indicates that each of the sprockets of the at least one sprocket assembly includes at least two upshifting gates except for a smallest sprocket of the at least one sprocket assembly, the processor is configured to perform the gear shift control including:

performing a first upshifting operation corresponding to the single shifting distance, waiting a second predetermined period after completing the first upshifting operation, and performing a second upshifting operation corresponding to the single shifting distance.

12. The bicycle component controller according to claim 1, wherein the first predetermined period is equal to the second predetermined period where a total number of the upshifting gates is equal to a total number the downshifting gates.

13. The bicycle component controller according to claim 1, wherein the processor is configured to automatically perform the gear shift control based on at least one of a cadence, a bicycle running speed, a bicycle tilt, and a gear ratio.

14. The bicycle component controller according to claim 1, wherein the processor is configured to perform the gear shift control response to a manual input which is input to a shifter.

15. The bicycle component controller according to claim 1, further comprising a data storage device containing the sprocket assembly information.

16. A bicycle component control system comprising the bicycle component controller according to claim 1, and further comprising a bicycle derailleur.

17. The bicycle component control system according to claim 16, wherein the bicycle derailleur includes at least one of a rear derailleur and a front derailleur.

18. The bicycle component control system according to claim 17, wherein the bicycle derailleur is a rear derailleur.

19. The bicycle component control system according to claim 16, wherein the bicycle derailleur includes a base member configured to be mounted to a bicycle frame, a movable member movable relative to the base member, a linkage mechanism configured to connect the base member to the movable member, and a pulley assembly rotatably connected to the movable member about a pulley assembly pivot axis.

20. The bicycle component control system according to claim 19, wherein the bicycle derailleur further includes an actuator operably connected to the linkage mechanism.

21. The bicycle component control system according to claim 20, wherein the actuator is disposed to one of the base member, the movable member, and the linkage mechanism.

22. The bicycle component control system according to claim 20, wherein the actuator is configured to be disposed to a bicycle frame, and the actuator operates a cable that is connected to the bicycle derailleur for operating the bicycle derailleur.

23. The bicycle component control system according to claim 19, wherein the bicycle derailleur further includes an angular sensor is disposed between the movable member and the pulley assembly for detecting a rotation angle of the pulley assembly with respect to the movable member.

24. The bicycle component control system according to claim 19, wherein the bicycle derailleur further includes a battery disposed to one of the base member, the movable member, and the linkage mechanism.

25. The bicycle component control system according to claim 24, wherein the bicycle component controller is disposed to at least one of the battery and the derailleur.

26. The bicycle component control system according to claim 16, further comprising a battery configured to be disposed to a bicycle frame, and electrically connected to the bicycle derailleur.

27. The bicycle component control system according to claim 16, and further comprising a non-shifting input device configured to select one of the sprocket assembly information of the at least one sprocket assembly for use in determining the gear shift control.

28. The bicycle component control system according to claim 27, wherein the non-shifting input device includes at least one of a cycle computer, a smartphone, a personal computer, and a switch provided to a bicycle.

29. The bicycle component control system according to claim 27, wherein the bicycle component controller is configured to wirelessly communicate with the non-shifting input device.

30. The bicycle component control system according to claim 27, wherein the bicycle component controller is configured to communicate with the non-shifting input device via a wire.

31. A bicycle component controller comprising:

a processor configured to perform a gear shift control based on a sprocket assembly information of at least one sprocket assembly, wherein the sprocket assembly information at least includes a total sprocket number and shifting gate information.

32. The bicycle component controller according to claim 31, further comprising a data storage device containing the sprocket assembly information.

* * * * *